United States Patent
Bjornemo et al.

(10) Patent No.: US 9,335,434 B2
(45) Date of Patent: May 10, 2016

(54) METHOD AND SYSTEM FOR PROCESSING DATA ACQUIRED IN AN ELECTROMAGNETIC SURVEY

(71) Applicant: PGS Geophysical AS, Lysaker (NO)

(72) Inventors: Erik Bjornemo, Knivsta (SE); Peter Lindqvist, Segeltorp (SE)

(73) Assignee: PGS GEOPHYSICAL AS, Oslo (NO)

( * ) Notice: Subject to any disclaimer, the term of this patent is extended or adjusted under 35 U.S.C. 154(b) by 811 days.

(21) Appl. No.: 13/667,484

(22) Filed: Nov. 2, 2012

(65) Prior Publication Data
US 2014/0129145 A1 May 8, 2014

(51) Int. Cl.
*G01V 3/38* (2006.01)
*G06F 19/00* (2011.01)
*E21B 49/00* (2006.01)
*G01V 1/48* (2006.01)
*G06F 17/40* (2006.01)

(52) U.S. Cl.
CPC . *G01V 3/38* (2013.01); *E21B 49/00* (2013.01); *G01V 1/48* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 4,617,518 A | 10/1986 | Srnka | |
| 6,167,348 A * | 12/2000 | Cannon | G01V 5/104 702/10 |
| 6,925,386 B2 | 8/2005 | Pramik et al. | |
| 7,196,969 B1 | 3/2007 | Karazincir | |
| 8,094,514 B2 | 1/2012 | Tenghamn | |
| 2010/0118647 A1 | 5/2010 | Tenghamn | |

FOREIGN PATENT DOCUMENTS

EP  2 284 575 A2  2/2011

* cited by examiner

*Primary Examiner* — Edward Cosimano

(57) ABSTRACT

The current application is directed to methods and systems for processing EM-survey data in order to extract accurate earth-response curves from the raw EM-survey data. The more accurate earth-response curves are obtained as a result of a generally non-linear decimation, or parameterization, of the earth-response curves, the non-linear parameterization generally applied to extraction of earth responses from raw EM-survey data collected by multiple EM sensors. Parameterization of the earth-response curves and data allows for greater accuracy in estimating the earth-response curves from raw EM-survey data due to use of estimation methods based on processing over-determined raw EM-survey data. In addition, parameterization of earth-response curves may lead to a decrease in computational complexity and an increase in computational efficiency in subsequent intermediate-stage and final-stage processing operations.

32 Claims, 32 Drawing Sheets

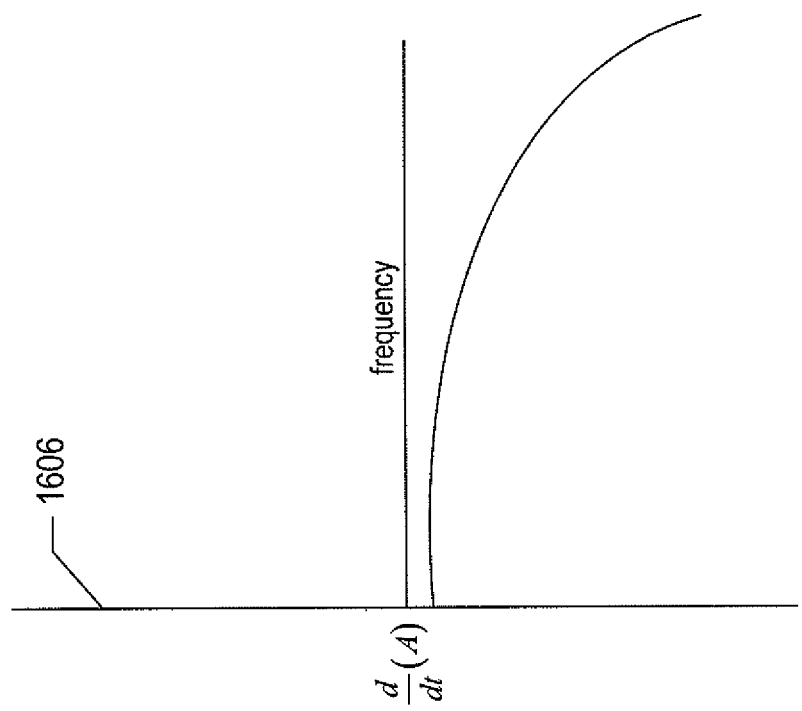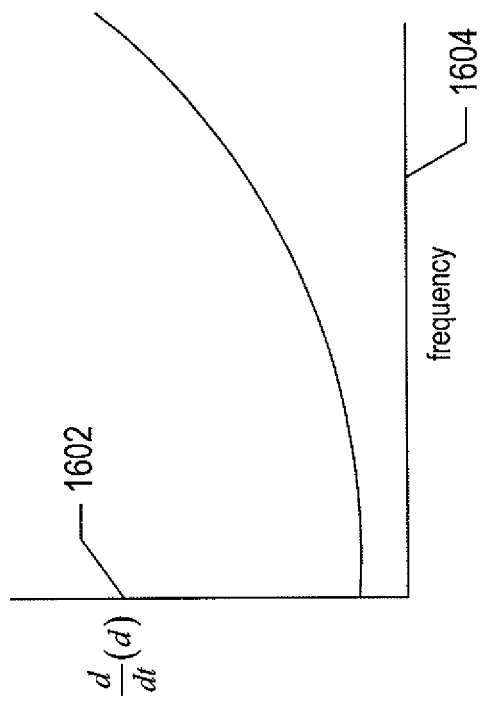
FIG. 16A
FIG. 16B

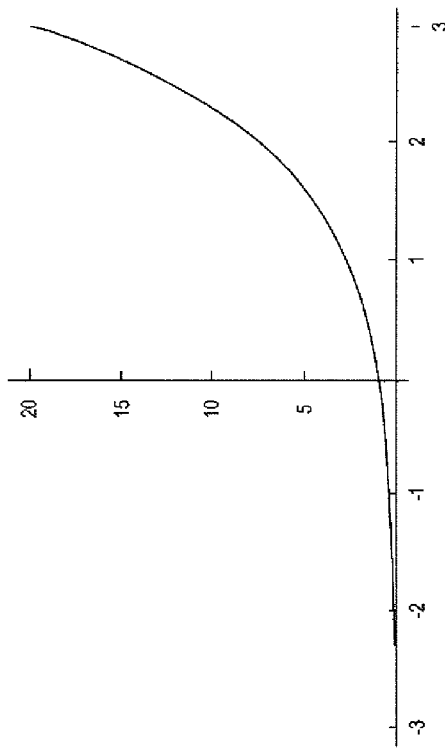
FIG. 20A
| $t$ | $t'=ln(t)$ |
|---|---|
| 0.1 | -2.30 |
| 0.2 | -1.61 |
| 0.3 | -1.20 |
| 0.4 | -0.92 |
| 0.5 | -0.69 |
| 0.6 | -0.51 |
| 0.7 | -0.37 |
| 0.8 | -0.22 |
| 0.9 | -0.11 |
| 1.0 | 0 |
| 1.1 | 0.96 |
| 1.2 | 0.18 |
| 1.3 | 0.26 |
| 1.4 | 0.37 |
| 1.5 | 0.41 |
FIG. 20B
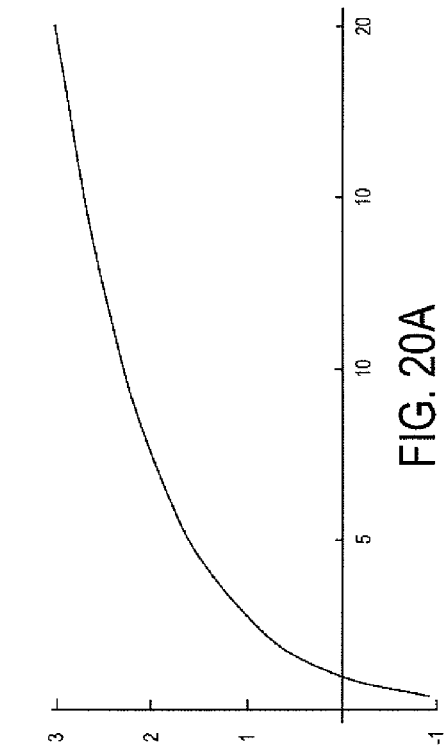
FIG. 21A
| $t'$ | $t=e^{t'}$ |
|---|---|
| -2.30 | 0.1 |
| -1.61 | 0.2 |
| -1.20 | 0.3 |
| -0.92 | 0.4 |
| -0.69 | 0.5 |
| -0.51 | 0.6 |
| -0.37 | 0.7 |
| -0.22 | 0.8 |
| -0.11 | 0.9 |
| 0 | 1.0 |
| 0.96 | 1.1 |
| 0.18 | 1.2 |
| 0.26 | 1.3 |
| 0.37 | 1.4 |
| 0.41 | 1.5 |
FIG. 21B

METHOD AND SYSTEM FOR PROCESSING DATA ACQUIRED IN AN ELECTROMAGNETIC SURVEY

BACKGROUND

Electromagnetic ("EM") survey technology, referred to below as "EM-survey technology," has been commercially used for locating hydrocarbon-rich subterranean features for less than 15 years. Marine controlled-source-EM ("CSEM") survey techniques and multi-transient-EM ("MTEM") survey techniques are two examples of EM-survey technology. CSEM-survey techniques employ generation of primary propagating time-varying EM fields using various EM sources, including towed bipole antennas, stationary bipoles, and other mobile and stationary EM sources. The primary propagating time-varying EM field extends downward into the subterranean environment, where the field induces secondary currents. The induced secondary currents, in turn, generate a secondary propagating time-varying EM field that is sensed, at various locations distributed across a relatively large area, in order to detect non-uniformities in the secondary EM field resulting from non-uniform electrical resistance in various features within the subterranean environment. Hydrocarbons and hydrocarbon-saturated rocks and sediments have much higher resistivities than water and water-saturated rocks and sediments. High-resistance subterranean pooled hydrocarbons and hydrocarbon-saturated rocks and sediments result in non-uniform distribution of secondary current paths and concentration of electrical field lines in conductive portions of the subterranean environment above the pooled hydrocarbons and hydrocarbon-saturated rocks and sediments. By taking multiple measurements across a wide area for each of many different bipole-antenna-transmitter locations, digitally encoded data sets are generated and stored in data-storage systems, which are subsequently computationally processed in order to provide indications of the longitudinal and latitudinal positions and depths of potential hydrocarbon-rich subterranean features. In many cases, three-dimensional plots, maps, or images, of the subterranean environment are generated as a result of these data-processing operations. The maps and images produced from CSEM-survey data can be used alone or in combination with maps and images produced by other methods, including marine exploration seismic methods, to locate subterranean hydrocarbon sources prior to undertaking the expense of marine-drilling operations to recover liquid hydrocarbon from subterranean sources.

MTEM-survey techniques are generally a time-domain EM technology, and are applicable to both land and marine surveying. While CSEM-survey sources generally produce continuous harmonic signals with a fundamental frequency and odd harmonics, MTEM-survey sources generally produce pseudo-random binary sequences ("PRBS") with a broad range of frequencies.

In the following discussion, the methods and systems to which the current application is directed are described in the context of CSEM-survey techniques. However, the methods and systems to which the current application is directed may be applied to MTEM-survey data and to data generated by other EM-survey techniques. To be clear, the phrase "EM-survey technique" refers to any of various techniques encompassed by EM-survey technology, including CSEM-survey and MTEM-survey techniques, the phrase "EM sensor" refers to any of various types of EM sensors used in various EM-survey techniques, including electric-field-strength sensors, electric-current-flux sensors, magnetic-field-strength sensors, and other such sensors, and the phrase "EM-sensor data" refers to data collected by EM sensors deployed in any of various EM-survey techniques, including CSEM-survey and MTEM-survey techniques. EM-survey techniques employ towed, or mobile, EM sources and EM sensors, stationary EM sources and EM sensors, or a combination of stationary and mobile EM sources and EM sensors of various types for producing a variety of different types of primary propagating EM fields, or primary EM signals, and detecting secondary propagating EM fields, or secondary EM signals, induced by the primary EM signals.

The raw CSEM-survey data collected during a CSEM survey are generally processed in numerous steps in order to create plots, maps, and/or images of a subterranean environment. In one initial step, described below, collected CSEM-survey data sets are deconvolved with respect to the EM signals used to elicit the CSEM-survey data in order to generate one or more earth-response curves, also referred to as "earth responses." In general, the earth-response curves do not correspond to simple, closed-form parameterized expressions, but are instead relatively complex response signals resulting from many different signal-propagation, signal-attenuation, and signal-modification characteristics of the complex subterranean environment and of the aqueous environment overlaying the subterranean environment. Currently, the secondary propagating time-varying EM field generated from the primary propagating time-varying EM field is sampled uniformly in time or frequency. However, uniform sampling generally results in sparsely sampling certain portions of the response signal and oversampling other portions of the response signal, resulting in uneven accuracy with which the earth-response function or curve is extracted from the raw CSEM-survey data. The limited accuracy of the extracted earth-response curves may propagate through, and be amplified in, subsequent intermediate and final-stage data processing, resulting in significant errors and lower-than-desired resolution in the plots, maps, and images produced as a product of CSEM-survey data analysis.

BRIEF DESCRIPTION OF THE DRAWINGS

FIGS. 16A-16B further illustrate characteristics of different frequency components of propagating time-varying EM fields within a C SEM-survey environment.

FIGS. 20A, 20B, 21A and 21B illustrate mapping functions and corresponding inverse mapping functions.

DETAILED DESCRIPTION

The current application is directed to methods and systems for processing EM-survey data in order to extract accurate earth-response curves from the raw EM-survey data. The more accurate earth-response curves are obtained as a result of a generally non-linear decimation, or parameterization, of the earth-response curves, the non-linear parameterization generally applied to extraction of earth responses from raw EM-survey data collected by multiple EM sensors. Parameterization of the earth-response curves and data allows for greater accuracy in estimating the earth-response curves from raw EM-survey data due to use of estimation methods based on processing over-determined raw EM-survey data. In addition, parameterization of earth-response curves may lead to a decrease in computational complexity and an increase in computational efficiency in subsequent intermediate-stage and final-stage processing operations.

A dataset that comprises a number of data points can often be represented, or parameterized, by any of a variety of computational methods that alternatively express the dataset using a number of parameter values significantly less than the number of data points. For example, when a time-associated sequence of data points are known to correspond, with a statistically quantified reliability, to an analytical function of time and one or more constant function parameters, such as the time constant in an exponential growth curve, then a very large number of data points may be alternatively represented by the analytical function and the values of a few analytical-function parameters. As another example, when it is know that the data points, when plotted, generally discretely represent a continuous function, then a nearly equivalent representation of the function can be obtained by deleting every other data point in a timed sequence of data points. Many other types of parameterization are known to those skilled in the art.

Figure 1A:
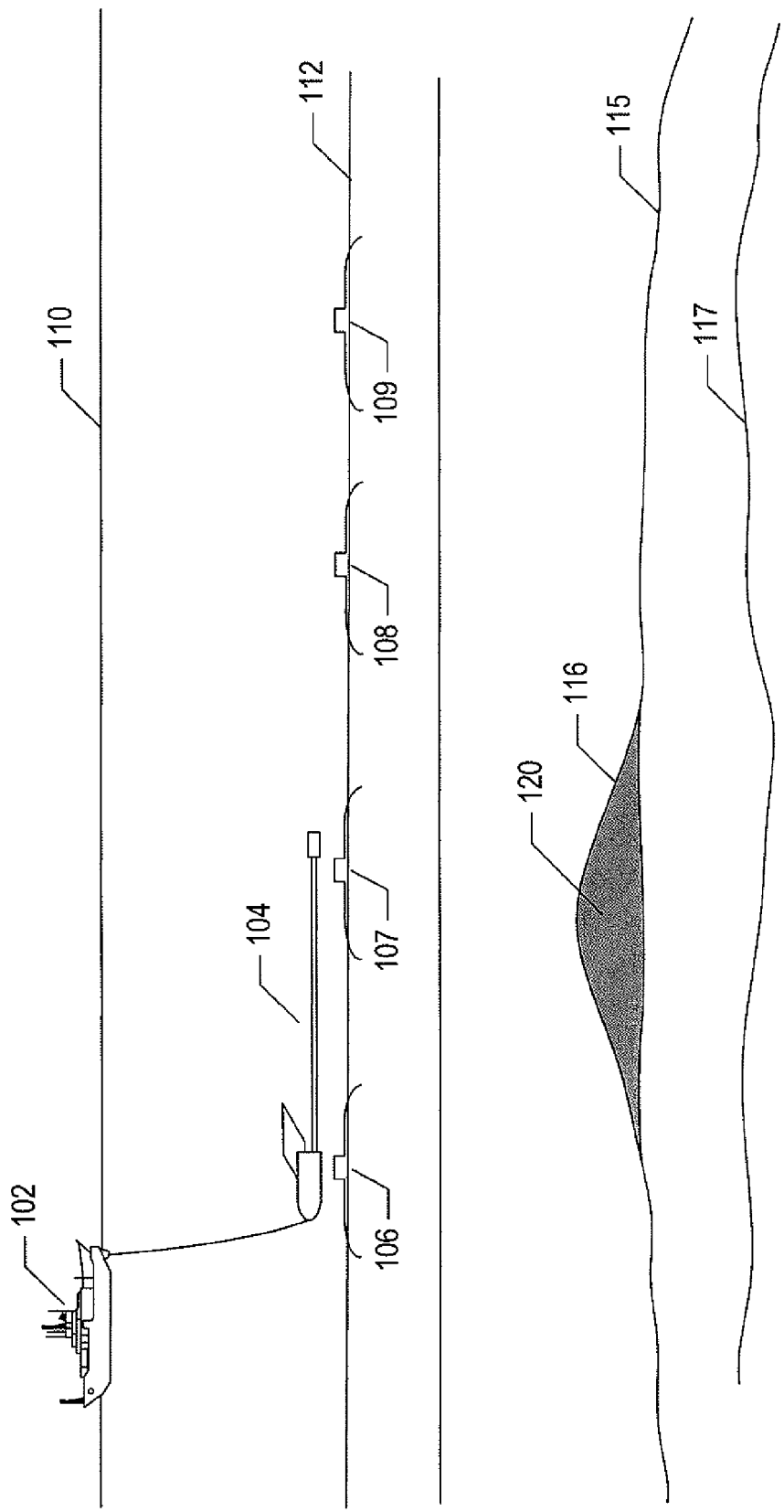
FIGS. 1A-1B illustrate raw-data collection in CSEM surveying.
Figure 1B:
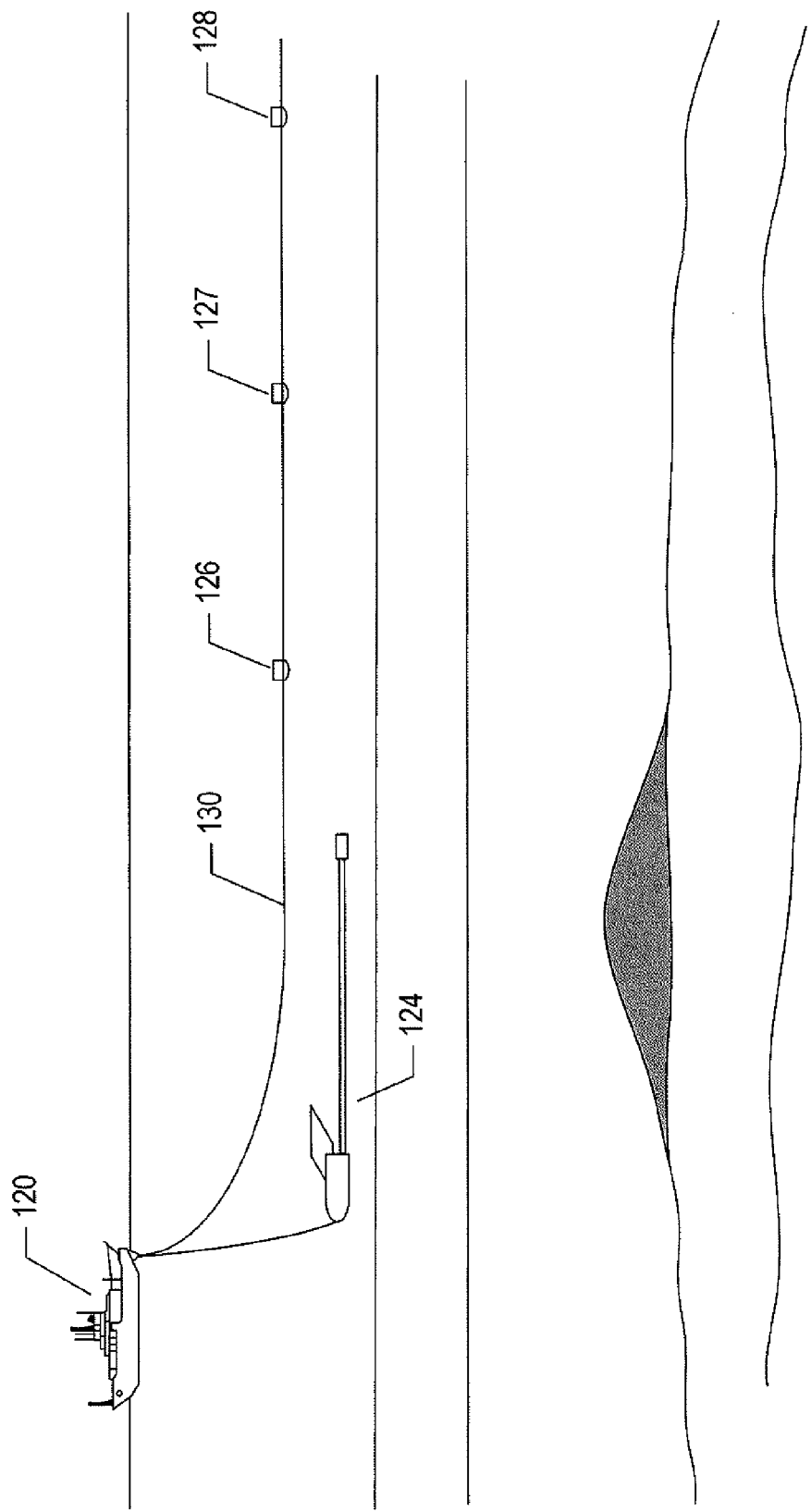

FIGS. 1A-1B illustrate raw-data collection in CSEM surveying. As mentioned above, the particular EM sources, EM sensors, and other CSEM-survey equipment may vary with different applications and with particular CSEM-survey techniques. FIGS. 1A-1B, the remaining figures of the current application that illustrate CSEM-survey techniques, and the accompanying text are intended as examples to illustrate one approach for conducting EM surveys, but are not intended as exhaustive descriptions of the many different alternative types of equipment and methods used in various different EM-survey techniques. Furthermore, the figures are not intended to imply optimal, or even generally-used spatial and temporal parameters, numbers of particular types of equipment, and other particular details, but are instead intended to illustrate various different EM-survey principles.

In FIG. 1A, a research vessel 102 is shown towing a submerged, long, horizontal, bipole transmission antenna 104. As discussed further below, time-varying currents, of magnitudes generally from hundreds to thousands of amperes, pass from the bipole transmission antenna 104 into the seawater, generating primary propagating time-varying EM fields. In certain CSEM methods, the transmission currents have binary wave forms with a fundamental frequency of 0.1 to 0.25 Hz, generating secondary, subterranean electric currents that, in turn, produce a secondary EM field. In other techniques, including inductively coupled time-domain CSEM, the transmission current is steadily ramped up to a relatively high, steady-on current value and then rapidly extinguished, leading to an electromotive force ("emf") impulse that generates secondary EM eddy currents in the subterranean environment which decay via Ohmic dissipation and which, in turn, produce weak, relatively short-lived secondary magnetic fields. The bipole transmission antenna 104 can be anywhere from 50 to 300 meters long or longer and is towed, in certain types of CSEM data-collection methods, at distances of 25 to 100 meters above the sea floor. In other data-collection methods, the bipole transmission antenna may be towed at various alternative positions with respect to the sea surface and sea floor, including position close to the sea surface. EM sensors 106, 107, 108, and 109 record the magnitude of the secondary EM-field strength and may additionally record phases of the secondary EM fields generated by the primary propagating time-varying EM field output by the bipole transmission antenna 104. In stationary-sensor methods, the EM sensors 106, 107, 108, and 109 are generally weighted with concrete or other environmentally benign weights, in order to securely plant themselves onto the sea floor, and are subsequently recovered at the surface after controlled release of the EM sensors from the weights. Although FIG. 1A illustrates four stationary electromagnetic field sensors, any number of electromagnetic field sensors may be selected to improve the operational efficiencies and costs of the marine CSEM survey.

In FIG. 1A, the sea surface is represented by horizontal line 110 and the sea floor by horizontal line 112. Lines 115, 116, and 117 represent subterranean layers of different compositions. The shaded region 120, bounded at the top by line 116 and at the bottom by line 115, represents a hydrocarbon-rich subterranean feature, the depth and positional coordinates of which may be determined by analysis of data collected during the CSEM survey. In many cases, the CSEM data may be processed to produce electrical-conductivity-based three-dimensional maps of the subterranean environment below the sea floor.

FIG. 1B illustrates an alternative method used for collection of raw CSEM-survey data. As in the method illustrated in FIG. 1A, a research vessel 120 tows a bipole transmission antenna 124 to generate a primary propagating time-varying EM field. However, unlike in the method illustrated in FIG. 1A, the research vessel 120 also tows a series of EM sensors 126-128 at fixed intervals along a towed streamer 130. Although FIG. 1B illustrates three towed electromagnetic field sensors 126-128, any number of electromagnetic field sensors may be selected to improve the operational efficiencies and costs of the marine CSEM survey. In this method, the bipole transmission antenna is not necessarily towed close to the sea floor. The length of the bipole transmission antenna 124 may exceed 300 meters by a substantial margin. Because the EM sensors are towed behind the research vessel, the positions of the EM sensors 126-128 may be continuously recorded along with EM-sensor output that reflects the instantaneous magnitude and phase of the secondary EM field at the current EM-sensor position. In some embodiments, the electromagnetic field sensors 126-128 may be towed by a second vessel (not shown). In yet other embodiments, a combination of stationary electric field sensors and towed electric field sensors may be used.

Figure 2:
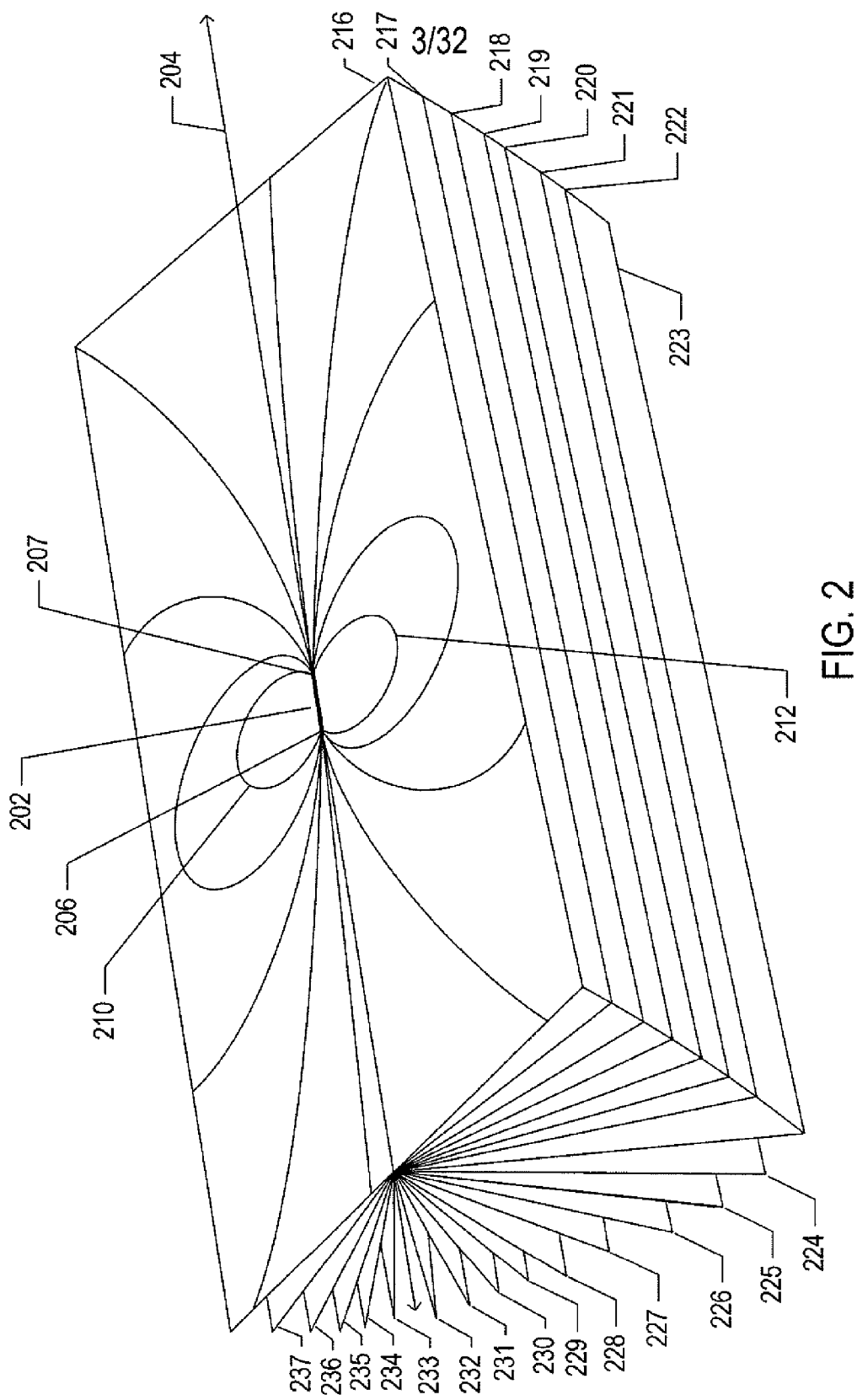
FIG. 2 illustrates a portion of the EM field produced by the bipole transmission antenna during a CSEM survey.

FIG. 2 illustrates a portion of the EM field produced by the bipole transmission antenna during a CSEM survey. In FIG. 2, the bipole transmission antenna is a short rectangle 202 along a radial direction indicated by double-headed arrow 204. The ends of the bipole transmission antenna coincide with the points 206-207 at which the two innermost elliptical field lines 210 and 212 shown in FIG. 2 intersect the radial line 204. FIG. 2 shows a series of planes 216-237 with central axes coincident with the radial line. The EM field lines are shown on the horizontal plane 216. Only those portions of the planes below the horizontal plane are shown in FIG. 2 in order to represent the EM field emitted from the bipole transmission antenna planar to, and downward into, the subterranean, environment underlying the sea floor. A more complete illustration of the EM field would include a set of corresponding planes with magnetic field lines, each plane perpendicular to a corresponding plane showing electric field lines. The perpendicular magnetic field lines generate secondary-EM-field electric field lines in the subterranean environment parallel to the electrical field lines generated by the bipole transmission antenna. In essence, the secondary currents produced by the primary EM field are images of the electric field line of the primary EM field translated downward into a subterranean environment. Thus, the horizontal electric field lines in plane 216 result in horizontal secondary-EM-field electric field lines generally parallel to the sea floor.

Figure 3:
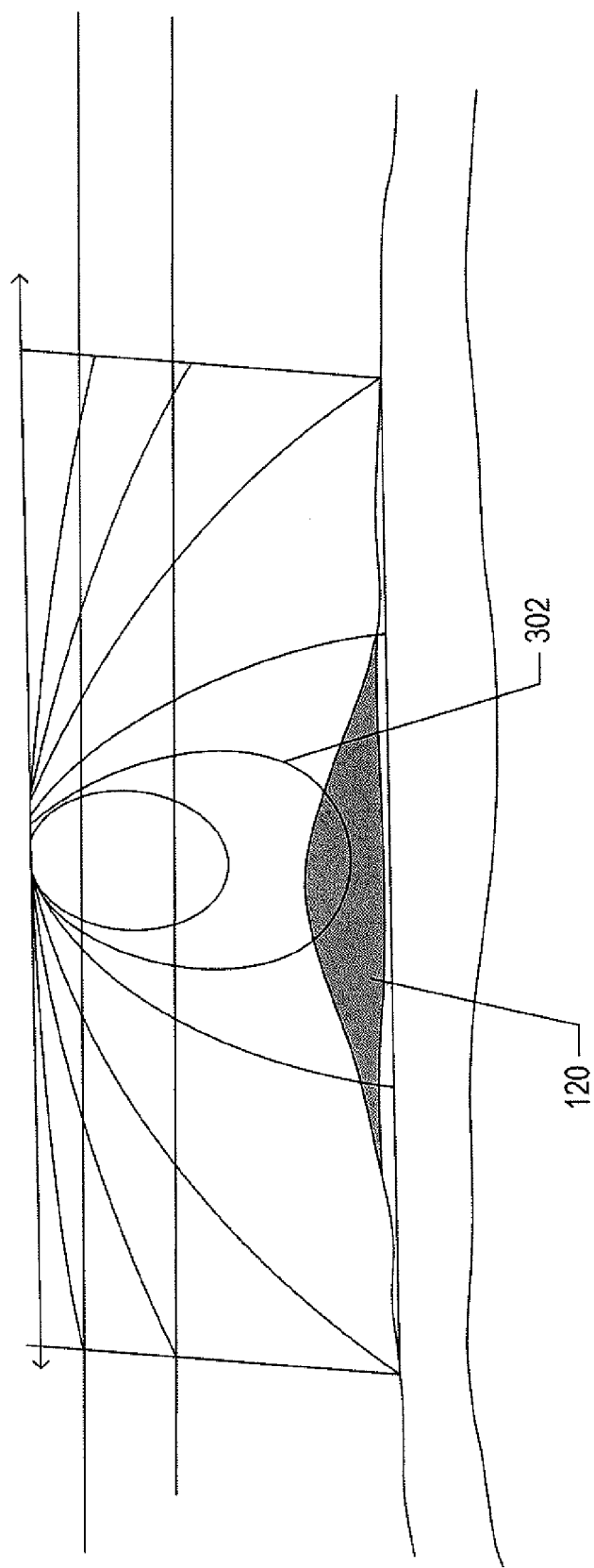
FIG. 3 shows the vertical plane (226 in FIG. 2) with electric field lines extending downward perpendicular to the sea floor from the bipole transmission antenna.
Figure 4:
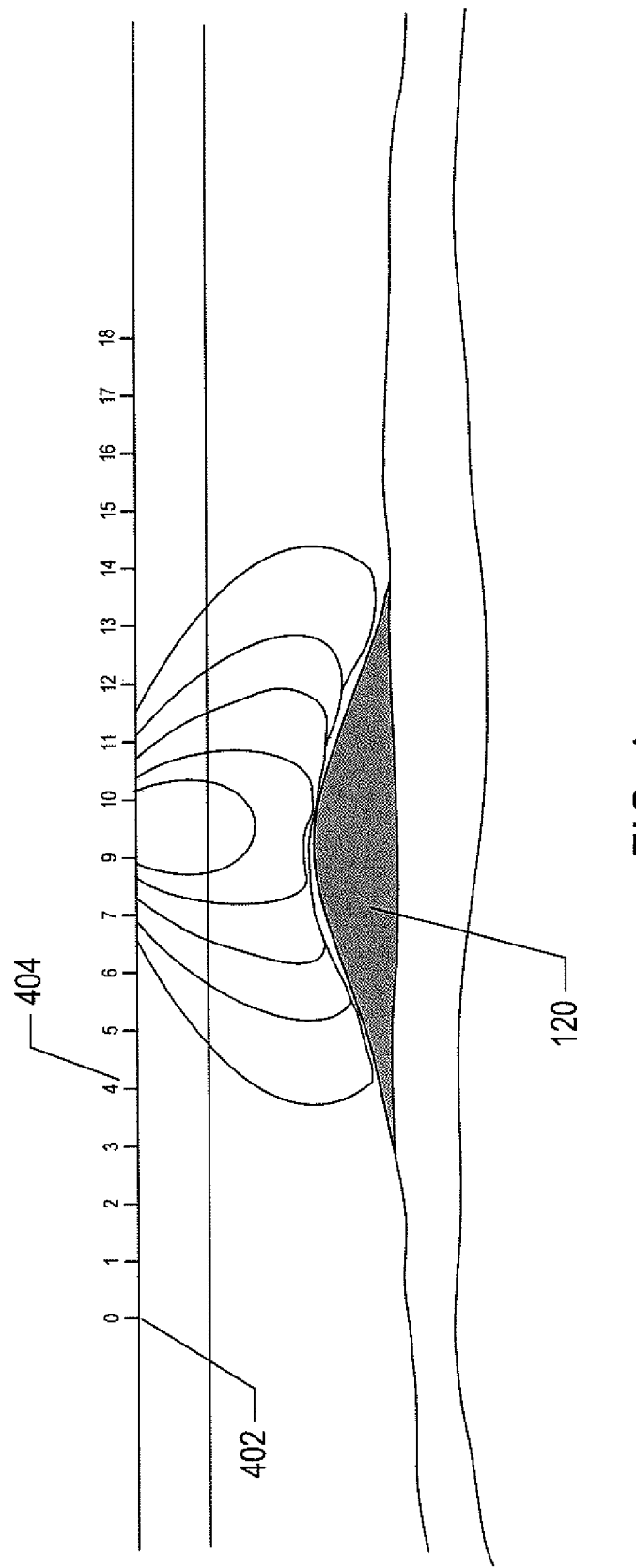
FIG. 4 illustrates distortion of the secondary electrical currents induced within the subterranean environment by the vertical component of the primary propagating time-varying EM field illustrated in FIG. 3.

FIG. 3 shows the vertical plane (226 in FIG. 2) with electric field lines extending downward perpendicular to the sea floor from the bipole transmission antenna. Note that electric field line 302 passes through the hydrocarbon-rich subterranean feature 120 as well as through overlying rock and sediment that is not saturated with hydrocarbon. The secondary current generated within the subterranean environment by the primary EM field is distorted by the presence of the hydrocarbon-rich subterranean feature. FIG. 4 illustrates distortion of the secondary electrical currents induced within the subterranean environment by the vertical component of the primary propagating time-varying EM field illustrated in FIG. 3. Because current follows the path of least resistance, and because the hydrocarbon-saturated subterranean feature 120 is highly resistant to electric-current flow, the elliptical electric currents are distorted by the presence of the hydrocarbon, concentrating field lines and current along the rocks and sediments directly above the hydrocarbon-rich subterranean feature. The concentration of current above the hydrocarbon-rich feature results in a distortion of the secondary EM field, increasing the field intensity at positions along the sea floor directly above and proximal to the underlying hydrocarbon-rich subterranean feature. However, the currents induced by the horizontal electric field lines shown in FIG. 2 are much less distorted by the hydrocarbon-saturated subterranean feature, since their secondary-EM-field image is also horizontal and thus field lines are either generally completely external to the hydrocarbon-rich subterranean feature or completely internal within the hydrocarbon subterranean feature, with some minor discrepancies at horizontal cross-section boundaries of the subterranean hydrocarbon-rich feature, and are thus far less distorted by the discrepancy in resistivity between the hydrocarbon-rich subterranean feature and surrounding sediment and rock. Assuming EM-sensor positions along the sea floor indicated by the numbered EM-sensor indications, such as the indication 402 for EM sensor 0, it would be expected that larger secondary EM field strength would be measured by EM sensors directly overlying the hydrocarbon-rich subterranean feature 120 than by EM sensors at greater distances from the hydrocarbon-rich subterranean feature and that, moreover, the vertical field strength would be significantly stronger than the horizontal field strength measured at the directly overlying EM sensors.

Figure 5A:
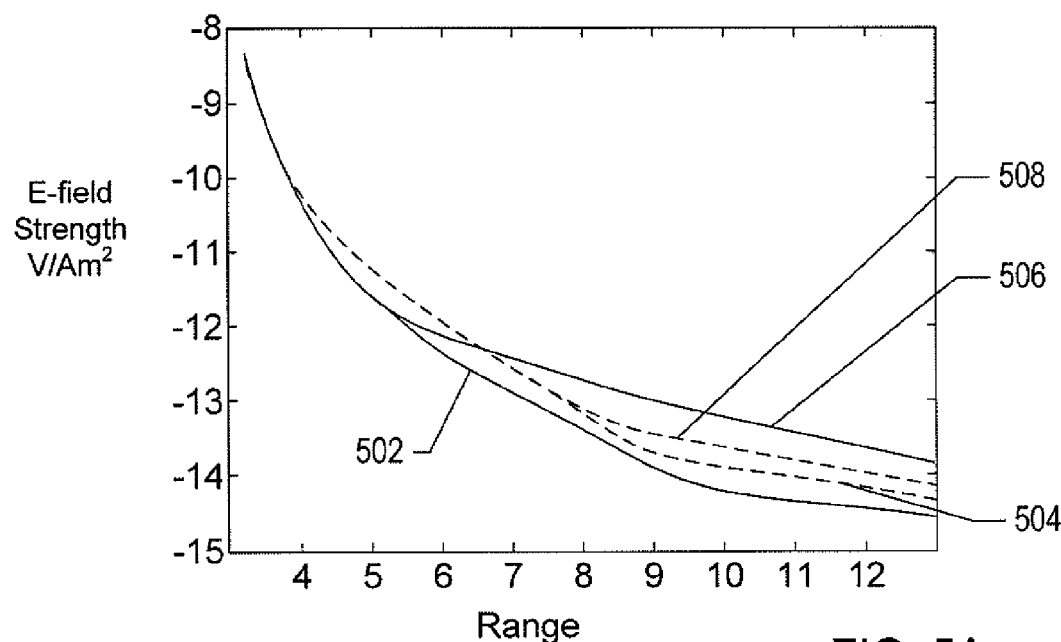
FIGS. 5A-5B provide hypothetical graphs of the EM field strength with respect to range.
Figure 5B:
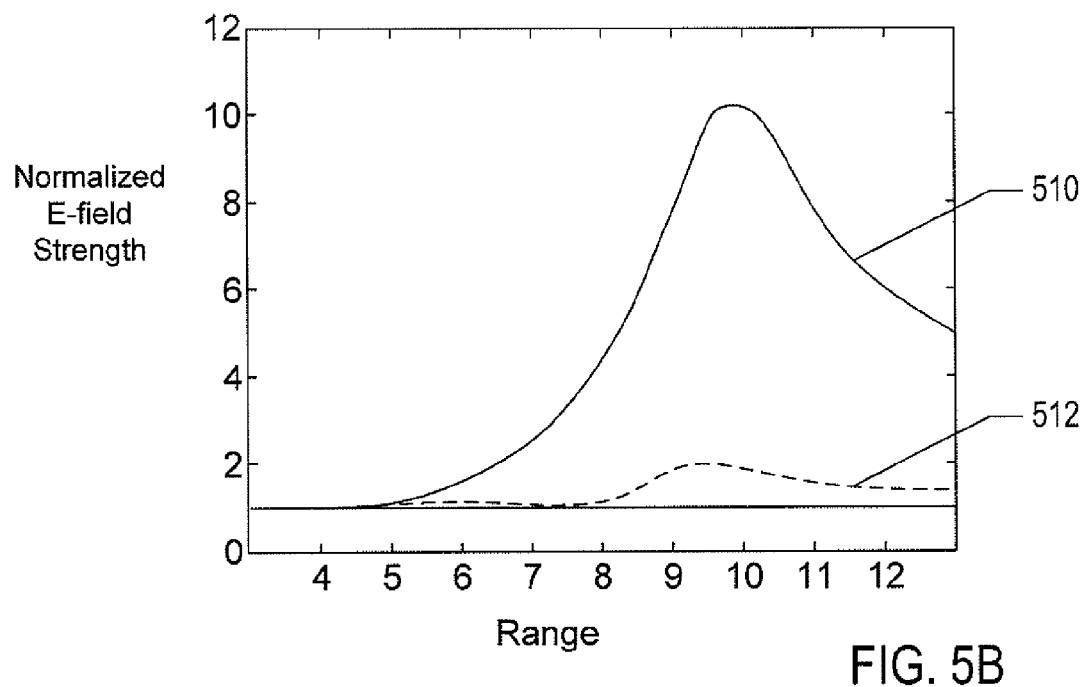

FIGS. 5A-5B provide hypothetical graphs of the EM field strength with respect to range. For simplification, the horizontal axes in both figures are marked with range distances corresponding to EM-sensor positions of the EM sensors shown in FIG. 4. FIG. 5A includes a solid curve 502 that represents an ideal field-strength vs. range curve for the vertical component of field strength and an ideal curve 504 for the horizontal component of field-strength vs. range, both ideal curves assuming a relatively homogeneous subterranean environment without marked non-uniformities in resistivity. FIG. 5A also shows a hypothetical observed field-strength vs. range curve for the observed vertical component of the secondary EM field 506 and a hypothetical observed field-strength vs. range curve for the horizontal component of the secondary EM field 508. When the observed curves are normalized to the ideal curves in FIG. 5A, the normalized field strength versus range curves shown in FIG. 5B are obtained. The solid curve 510 represents the normalized E-field strength in the vertical direction and the dashed curve 512 represents the normalized E-field-strength vs. range curve for the horizontal component of the secondary EM field. The field strength for the vertical component peaks at range values corresponding to the positions of EM sensors 9 and 10, directly overlying the hydrocarbon-rich subterranean feature (120 in FIG. 4). The magnitude of the horizontal component of the secondary EM field also increases in the neighborhood of EM sensors 9 and 10, as can be seen from curve 512 in FIG. 5B, to a much smaller extent.

The ideal curves 502 and 504 generally decrease exponentially with range due to the attenuation of field strength with distance in conductive media, such as rock and sediment, although the relationship between field strength and range may depend on additional parameters and may exhibit characteristics that fail outside of strict exponential decrease. The field strength attenuates at a vastly lower rate in air and does not attenuate in a vacuum. The model illustrated in FIGS. 4 and 5A-5B assumes a bipole transmission-antenna position to the left of the position of EM sensor 4 404 in FIG. 4. The bipole transmission antenna may be positioned close to the sea floor and in fairly deep water so that the portion of the EM field generated by the bipole transmission antenna in an upward direction is attenuated before reaching the water/air interface. In certain cases, the EM field can be partially reflected from the water/air surface downward and interfere with the primary EM field generated by the bipole transmission antenna.

A damped wave equation can be used to model the electric vector field E:

$$\nabla^2 E = \mu\sigma\frac{\partial E}{\partial t} + \mu\varepsilon\frac{\partial^2 E}{\partial t^2}$$

where t is time;
μ is magnetic permeability;
ε is electric permeability;
σ is conductivity; and
E is the electric field vector.

In subsurface rock, $\sigma > 10^9 \varepsilon$, and thus:

$$\nabla^2 E = \mu\sigma\frac{\partial E}{\partial t}.$$

Solutions of this equation for E have the form:

$$E = E_0 e^{-i\beta z} e^{-\alpha z}$$

for uniform harmonic excitation at angular frequency ω, where z is related to skin dept $z_s$:

$$z_s = 1/\alpha = 1/\beta = \sqrt{2/(\sigma\mu_0\omega)}.$$

The parameter α is the exponential attenuation term and the parameter β is the exponential phase-lag term. Alternatively, the model may be expressed in terms of the magnetic vector field B:

$$\nabla^2 B - \mu\sigma\frac{\partial B}{\partial t} - \mu\varepsilon\frac{\partial^2 B}{\partial t^2} = U \cdot \nabla \times J_s$$

where $J_s$ is the source current.

Many different types of instrumentation-generated time-varying EM fields can be used in CSEM surveys, many different types of EM sensors can be used to detect both amplitude and phase information for the secondary EM field induced by the primary EM field, and many different types of mathematical models and corresponding data-processing methods can be applied, depending on the type of primary EM field, recorded EM-sensor information, and desired output, in order to generate location information, maps, and images. These data-processing methods involve complex matrix operations, including matrix inversions, Fourier transforms, migrations, inversions, stacking, and other such operations familiar to those involved in CSEM-survey-data and exploration-seismology-data analysis. A person of ordinary skill in the art can recognize and select applicable mathematical models, data-processing methods, equipment, processes, and parameter values for particular types EM surveys.

It should be noted, prior to discussing details of the data-processing methods and systems to which the current application is directed, that these methods and systems are not disembodied, abstract concepts, mathematical abstractions, or sequences of symbols. Instead, the currently disclosed methods and systems are carried out in computer systems and other data-processing engines and convert CSEM-survey data, physically recorded within physical data-storage devices, such as mass-storage devices and electronic memories, to estimates of earth-response curves and other derived results, also physically stored within physical data-storage devices. The earth responses are subsequently processed to produce CSEM-survey data analyses, maps, and images of subterranean environments. The currently disclosed response-curve parameterization methods and systems incorporating the methods produce more accurate estimates of earth-response curves and other derived results, leading to differences in physically stored response-curve data and to different, physically stored results of intermediate-stage and final-stage data processing based on the more accurately determined response curves. The currently disclosed methods and systems are also physically manifested in higher-resolution images and subterranean features, as one example, and parameterized earth-response curves lead to lower computational complexity and higher computational efficiency that directly translates into less energy usage for downstream data processing and decreased demands for memory and mass-storage capacity. The results and benefits of the currently disclosed nonlinear response-curve parameterization methods and systems are real, physically manifested, and measurable.

Figure 6:
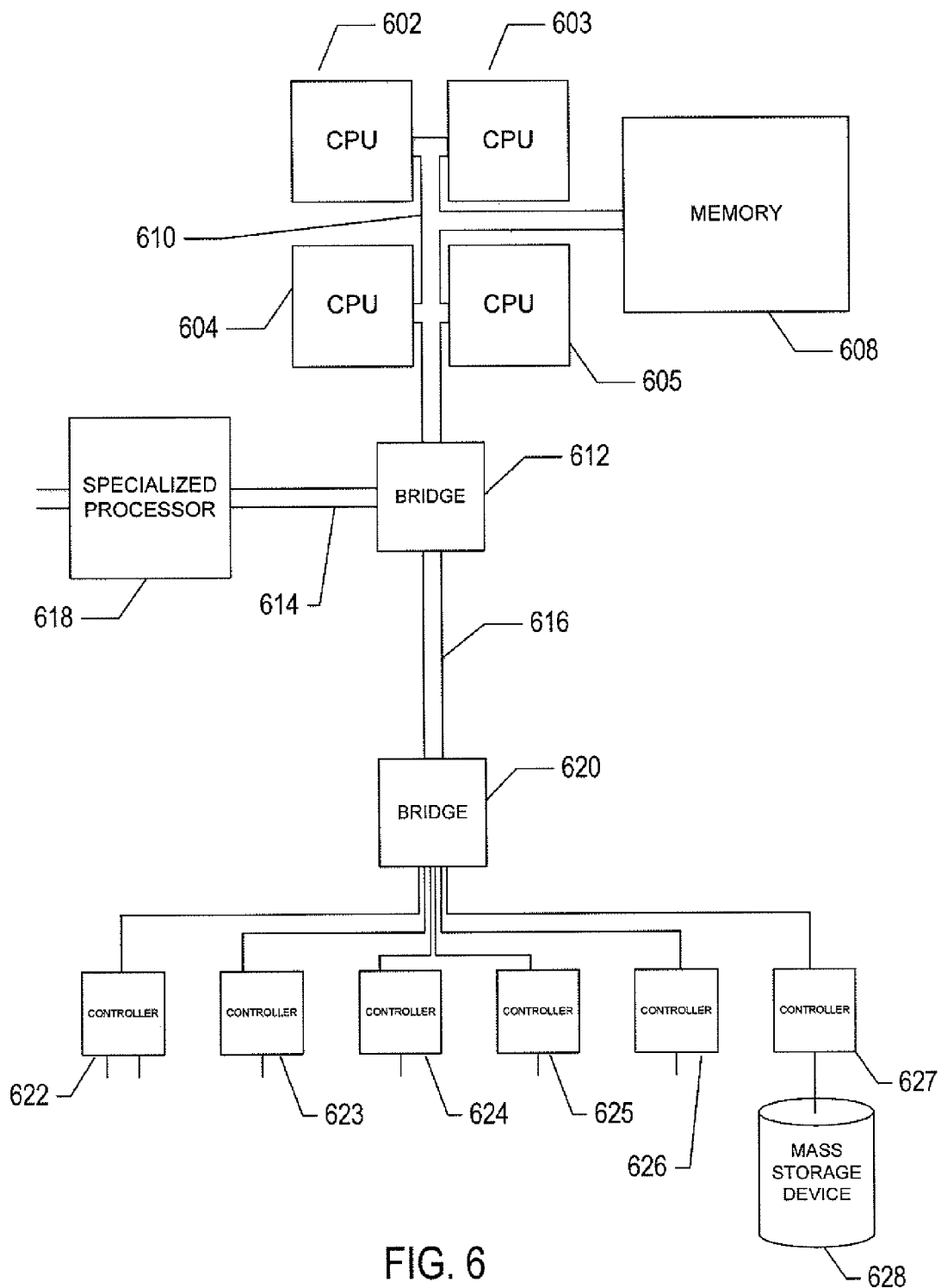
FIG. 6 provides a high-level diagram of a generalized computer system, representative of computer systems employed in CSEM-survey data processing and analysis.

FIG. 6 provides a high-level diagram of a generalized computer system, representative of computer systems employed in CSEM-survey data processing and analysis. When controlled by software programs and logic circuitry to carry out the currently disclosed data-processing methods, these computer systems become special-purpose computing machinery for processing CSEM-survey data. The computer system contains one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616, or other types of high-speed interconnection media, including multiple, high-speed serial interconnects. These busses or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
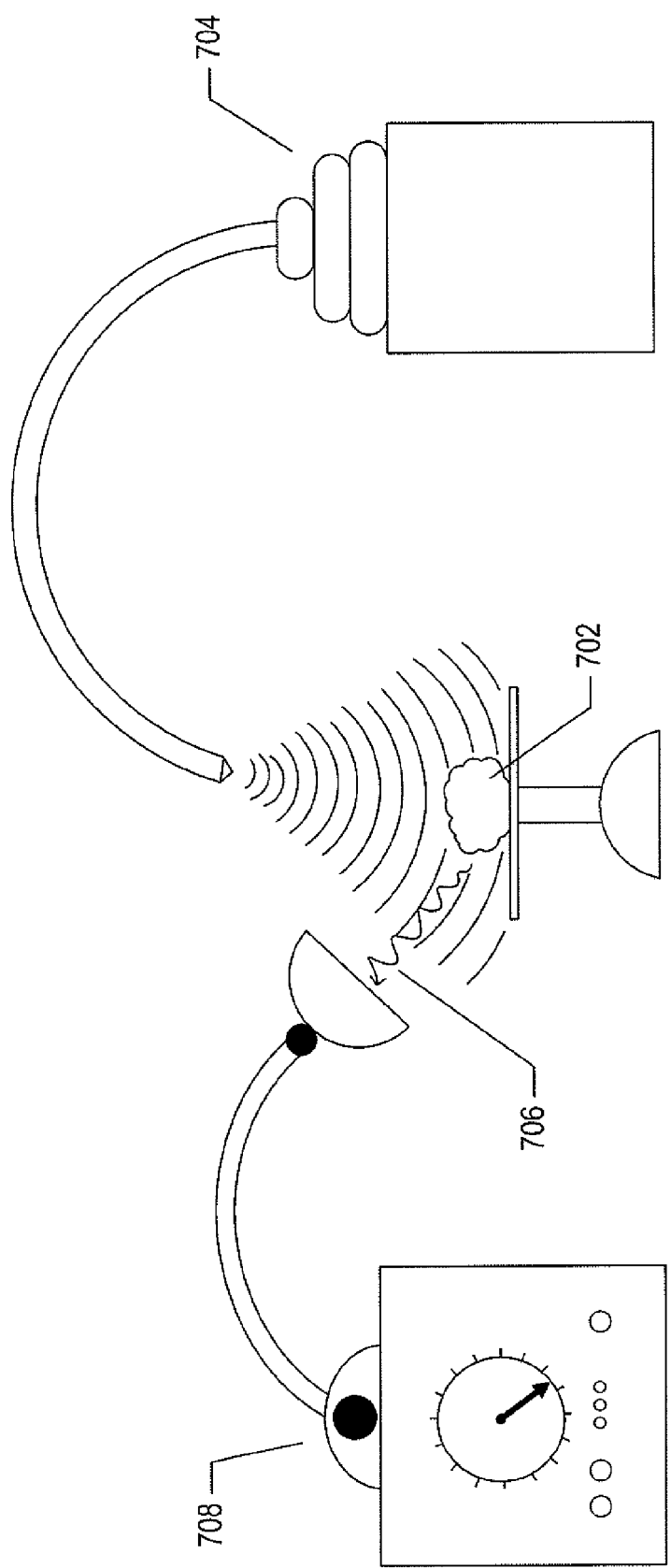
FIG. 7 illustrates a simple, hypothetical experiment.

Next, estimation of values from experimental data is discussed with reference to FIGS. 7, 8A, 8B, 8C, 9, 10, 11 and 12. FIG. 7 illustrates a simple, hypothetical experiment. A sample 702 is illuminated or irradiated by a primary illumination or radiation source 704 and produces, in response to the illumination or irradiation, a secondary response signal 706 that is detected by a secondary-signal detection apparatus 708.

Figure 8C:
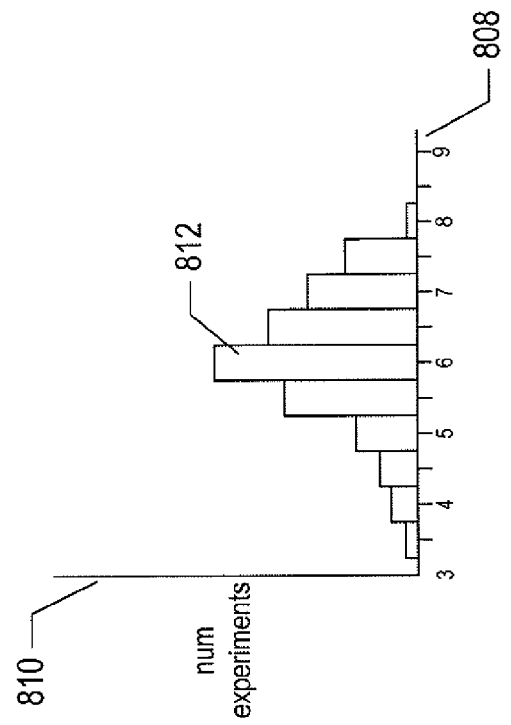
FIGS. 8A-8C illustrate various types of results that may be produced by the experimental apparatus shown in FIG. 7.
Figure 8B:
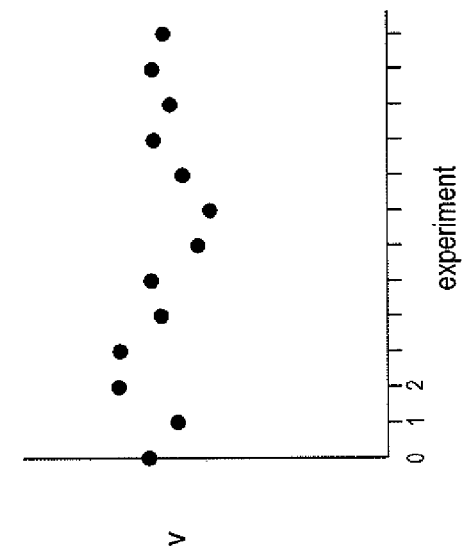
Figure 8A:
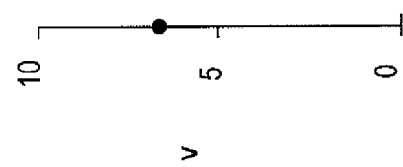

FIGS. 8A-8C illustrate various types of results that may be produced by the experimental apparatus shown in FIG. 7. In the case that a single illumination or irradiation is carried out, followed by a single secondary-signal detection, and assuming that the secondary signal is measured in units of v, a single data point is collected from the experiment, as illustrated in FIG. 8A. In general, a single data point is relatively uninformative, because it is not possible to characterize the magnitude of errors associated with experimental determination of the magnitude of the secondary signal. In general, the measured secondary-signal magnitude, $m_v$, can be modeled as:

$$m_v = v + e,$$

where v is the measurement that would be obtained by an error-free experiment and e is the error that accrues during determination of an experimental value corresponding to v. The error e may be a compound error that includes terms or components reflective of the error in determining or estimating the magnitude of the source illumination or irradiation, errors due to sample handling and irregularities, and errors in the detection apparatus and operation of the detection apparatus, among many possible sources of errors.

In general, experiments are repeated in order to obtain an estimate of the experimental error, from which a better estimate for the experimentally determined value can be made. As one example, FIG. 8B illustrates the experimentally determined values v obtained by repeating the experiment illustrated in FIG. 7 13 times. As shown in FIG. 8B, the experimentally determined values are distributed over a range of v values. In FIG. 8C, the data for a large number of experiments is plotted in the form of a histogram, with experimentally determined values v plotted with respect to the horizontal axis 808 and the number of experiments producing each different experimentally determined value plotted with respect to the vertical axis 810. Each vertical bar of the histogram, such as bar 812, represents the number of experiments for which the experimentally produced value v falls within a range of values represented by the line segment where the horizontal axis is intersected by the bar. For a number of repeated experiments, an experimentally determined value $m_{vn}$ for an $n^{th}$ experiment can be modeled as:

$$m_{vn} = v + f(n),$$

where $f(n)$ is an error function based on an error distribution. When, for example, the accumulated experimental errors can be modeled as normally distributed, then the mean and variance or standard deviation for the normally distributed experimental errors can be estimated with a precision related to the number of experiments conducted, and this parameterized error function can then be used to compute a more accurate estimate for the value or property that is being determined by the experiment. Of course, there are many different types of errors, including systematic errors, which are not generally normally distributed and which are addressed using different types of models and error-correction methods. However, in general, the greater the number of experiments and experimental values obtained by the experiments, the better an underlying measured characteristic or parameter can be estimated from the experimental values. While a single experimental value, as illustrated in FIG. 8A, does provide some information with respect to the characteristic or parameter that is being experimentally determined, an experimental over-determination of the characteristic or parameter by repeating the experiment multiple times generally leads to a much more precise and robust estimate of the characteristic or parameter.

Figure 9:
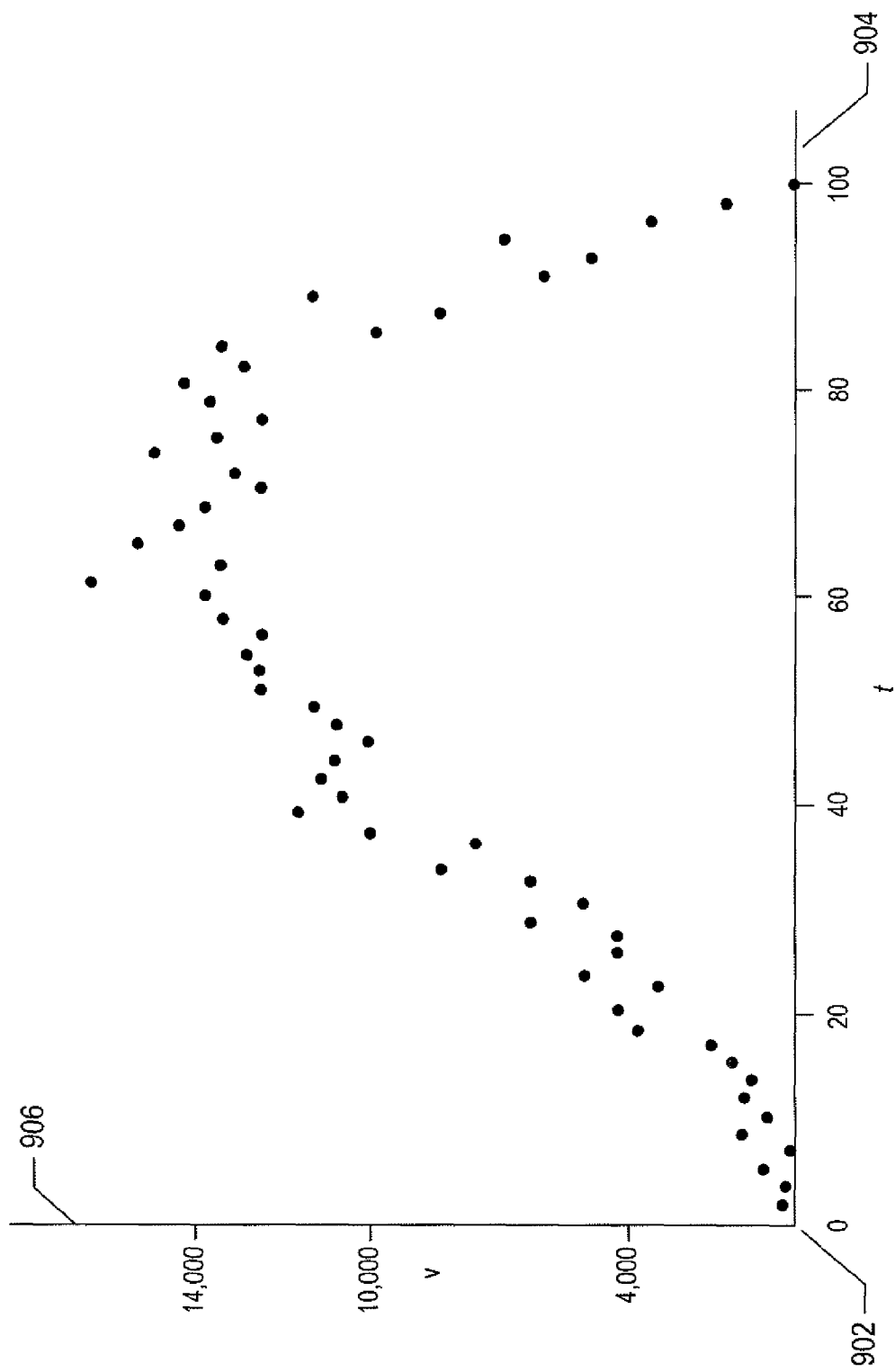
FIG. 9 illustrates experimental data for an experiment in which an initial impulse is delivered to a sample.

Similar considerations apply to experimental measurements or recording of a signal over time. FIG. 9 illustrates experimental data for an experiment in which an initial impulse is delivered to a sample. The impulse is delivered at or before a time 0 (902 in FIG. 9) and secondary emissions from the sample are recorded over an interval of 100 seconds, plotted with respect to the horizontal axis 904, following the impulse. The vertical axis 906 represents the magnitude of the secondary emission or response in units of v. As can be seen in FIG. 9, the recorded values over the time interval do not together compose a smooth curve.

Figure 10:
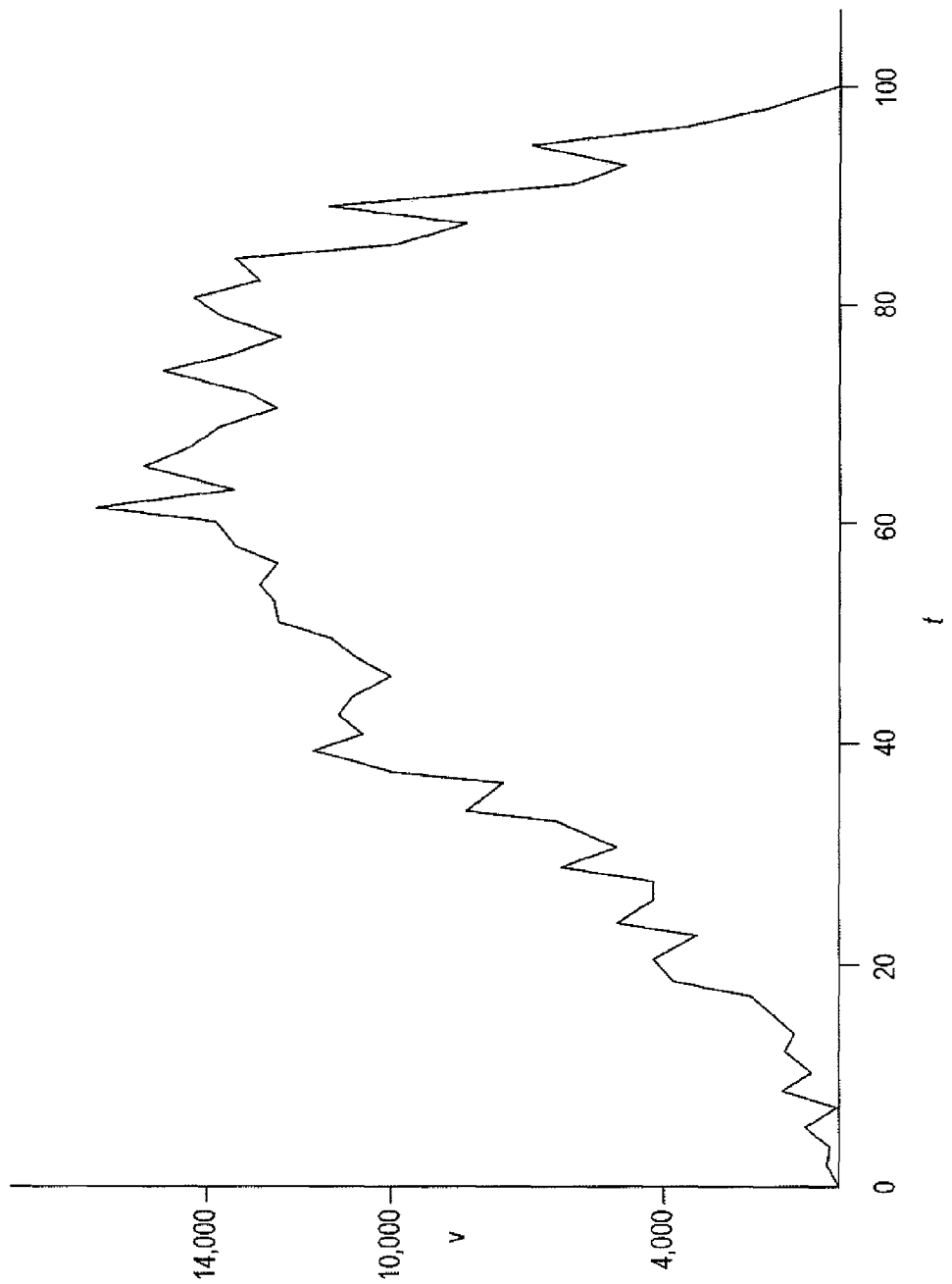
FIG. 10 illustrates a curve produced by connecting the plotted experimentally-determined values shown in FIG. 9 by line segments.

There are numerous different approaches for analyzing the experimental results illustrated in FIG. 9. One method is to assume the signal is continuous, and connect all the measured values together by line segments in order to generate a continuous curve. FIG. 10 illustrates a curve produced by connecting the plotted experimentally-determined values shown in FIG. 9 by line segments. As can be seen in FIG. 10, the resulting curve is not smooth, but instead relatively erratic, with many sharp peaks and valleys. It may be the case that, in fact, the signal does indeed vary significantly over short time periods and that the many sharp peaks and valleys correspond to physical properties or characteristics of the sample. However, it may also be the case that the signal is generally smooth and continuous, and the many sharp peaks and valleys seen in FIG. 10 are products of experimental error and/or noise.

Figure 11:
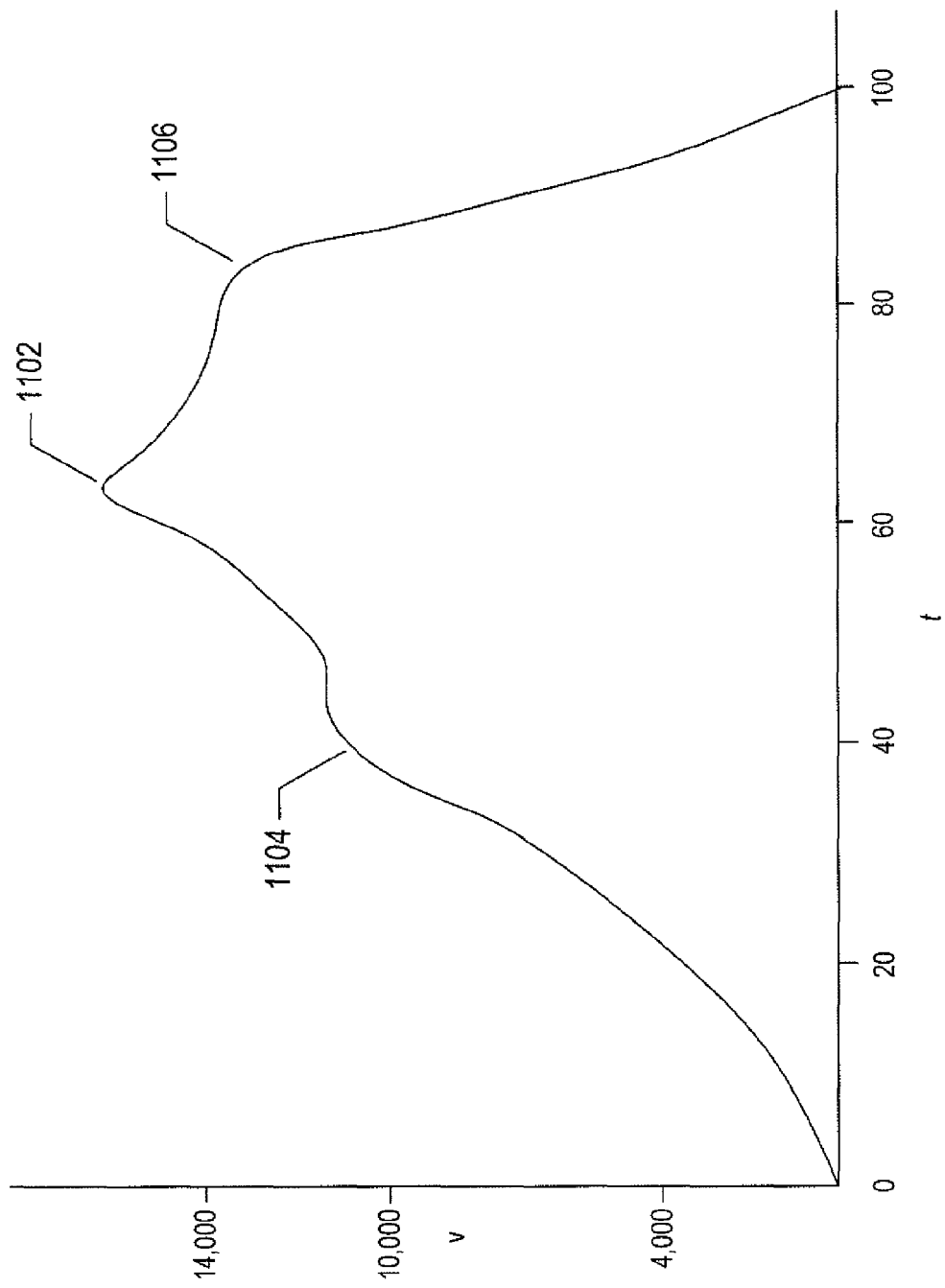
FIG. 11 illustrates a different approach to analysis of the experimental data plotted in FIG. 9.

FIG. 11 illustrates a different approach to analysis of the experimental data plotted in FIG. 9. In the approach taken in FIG. 11, a local averaging method is used to generate a smoothed curve that best fits data points. The smoothing method is, however, generally arbitrary, with the overall shape and characteristics of the smooth curve dependent on the values of various smoothing-operation parameters, including the length of intervals over which data values are averaged and the number of smoothing cycles carried out. Again, as with the erratic curve plotted in FIG. 10, it may not be clear that the detail in the smooth curve, including the relatively sharp peak 1102 and broad shoulders 1104 and 1106 correspond to physical processes and characteristics or instead to experimental error and noise.

In a different approach, when it is known beforehand that the response signal can be parameterized or mathematically characterized by a closed-form expression that includes experimentally determined parameters, a much better estimation of the plot signal can be made. For example, it may be the case that it has been determined, by prior experimentation and analysis, that the response signal can be modeled as a third-degree polynomial:

$$v(t) = at + bt^2 + ct^3$$

where the constants a, b, and c are parameters. Therefore, the analysis of the data generated from an experiment, plotted in FIG. 9, can be directed to determining the best possible estimates for the constants a, b, and c rather than to estimate the general shape and position of the curve over the 100-second time interval. Estimating the values of three constants, or three significant degrees of freedom, is a much simpler task than estimating the shape of a continuous curve over a data-collection interval, which involves estimation a very large number of significant degrees of freedom corresponding to points in a discrete representation of the curve. The estimation of the a, b, and c parameters can be carried out in many different ways, including using the least-squares estimation method, as next described.

In the least-squares method, the parameter values are over-determined by a much larger number of data points. Assuming that the time-dependent experimentally determined values v follow a third-degree polynomial:

$$v(t) = \beta_1 t + \beta_2 t^2 + \beta_3 t^3,$$

then a least-squares estimation method attempts to minimize a function S of the estimated parameter values and experimentally observed data. The function S can be expressed as:

$$S(\beta_1, \beta_2, \beta_3) = \sum_{t=0}^{T} [v(t) - (\beta_1 t + \beta_2 t^2 + \beta_3 t^3)]^2.$$

In other words, S is the sum of the squares of the differences between the values $v_i$ observed during the experiment and the corresponding values v(t) calculated using the constants $\beta_1$, $\beta_2$, and $\beta_3$. When the experimentally determined values v(t) are error-free and the constants $\beta_1$, $\beta_2$, and $\beta_3$ correctly determined, then the value of $S(\beta_1, \beta_2, \beta_3)$ will be 0. In that case, for each experimentally determined value v(t):

$$v(t) = \sum_{j=1}^{3} \beta_j t^j.$$

This can be alternatively represented as:

$$v(t) = \sum_{j=1}^{3} t^j \beta_j$$

$$v(t=i) = \sum_{j=1}^{3} X_{ij} \beta_j$$

where $X_{ij}$ is the $j^{th}$ of the power of the time t=i. This expression can be recast in vector/matrix form as follows:

$$V = \begin{bmatrix} v(t_1) \\ v(t_2) \\ v(t_3) \\ \vdots \\ v(t_T) \end{bmatrix}$$

$$X = \begin{bmatrix} t_1 & t_1^2 & t_1^3 \\ t_2 & t_2^2 & t_2^3 \\ t_3 & t_3^2 & t_4^3 \\ t_4 & t_4^2 & t_1^2 \\ \vdots & \vdots & \vdots \\ t_T & t_T^2 & t_T^3 \end{bmatrix}$$

$$\beta = \begin{bmatrix} \beta_1 \\ \beta_2 \\ \beta_3 \end{bmatrix}$$

$$V = X\beta.$$

Continuing with vector/matrix notation, the least-squares estimation that can be expressed as the following optimization problem with constraints:

$$\beta = \underset{\beta}{\operatorname{argmin}}\,(S(\beta))$$

and the function S can be expressed as:

$$S(\beta) = \|V - X\beta\|^2.$$

At a value of S that represents a local or global minimum, the gradient is 0, expressed as:

$$\nabla S(\beta) = 0,$$

and alternately expressed as:

$$\frac{\partial S}{\partial \beta_1} + \frac{\partial S}{\partial \beta_2} + \frac{\partial S}{\partial \beta_2} = 0.$$

The residual at a particular time i, $r_i$, is:

$$r_i = V_i - \sum_{j=1}^{3} X_{ij} \beta_j.$$

Thus, the function S can be alternatively expressed as:

$$S = \sum_{i=1}^{T} r_i^2.$$

The partial differential of S with respect to $\beta_j$ is, therefore:

$$\frac{\partial S}{\partial \beta_j} = \partial \sum_{i=1}^{T} r_i \frac{\partial r_i}{\partial \beta_j}.$$

Because $$\frac{\partial r_i}{\partial \beta_j} = -X_{ij},$$

the partial differential of S with respect to $\beta_k$ can be expressed as:

$$\frac{\partial S}{\partial \beta_k} = \frac{\partial}{\partial \beta_k} \sum_{i=1}^{T} \left( V_i - \sum_{j=1}^{3} X_{ij} \beta_j \right)(-X_{ik})$$

$$= \frac{\partial}{\partial \beta_k} \sum_{i=1}^{T} \left( \sum_{j=1}^{3} X_{ij} X_{ik} \beta_j \right) - X_{ik} V_i.$$

Therefore, using the partial-differential expression for the gradient and the fact that the gradient is 0 at the minimal value of $S(\beta)$:

$$\nabla S(\beta) = \frac{\partial}{\partial \beta_k} \sum_{k=1}^{3} \sum_{i=1}^{T} \left( \sum_{j=1}^{3} X_{ij} X_{ik} \beta_j \right) - X_{ik} V_i = 0,$$

which can be recast, in vector notation, as:

$$X^T X \hat{\beta} = X^T V.$$

This equation can be solved for the vector of constant parameters $\beta$ to provide an estimate for those parameters:

$$\hat{\beta} = (X^T X)^{-1} X^T V.$$

Figure 12:
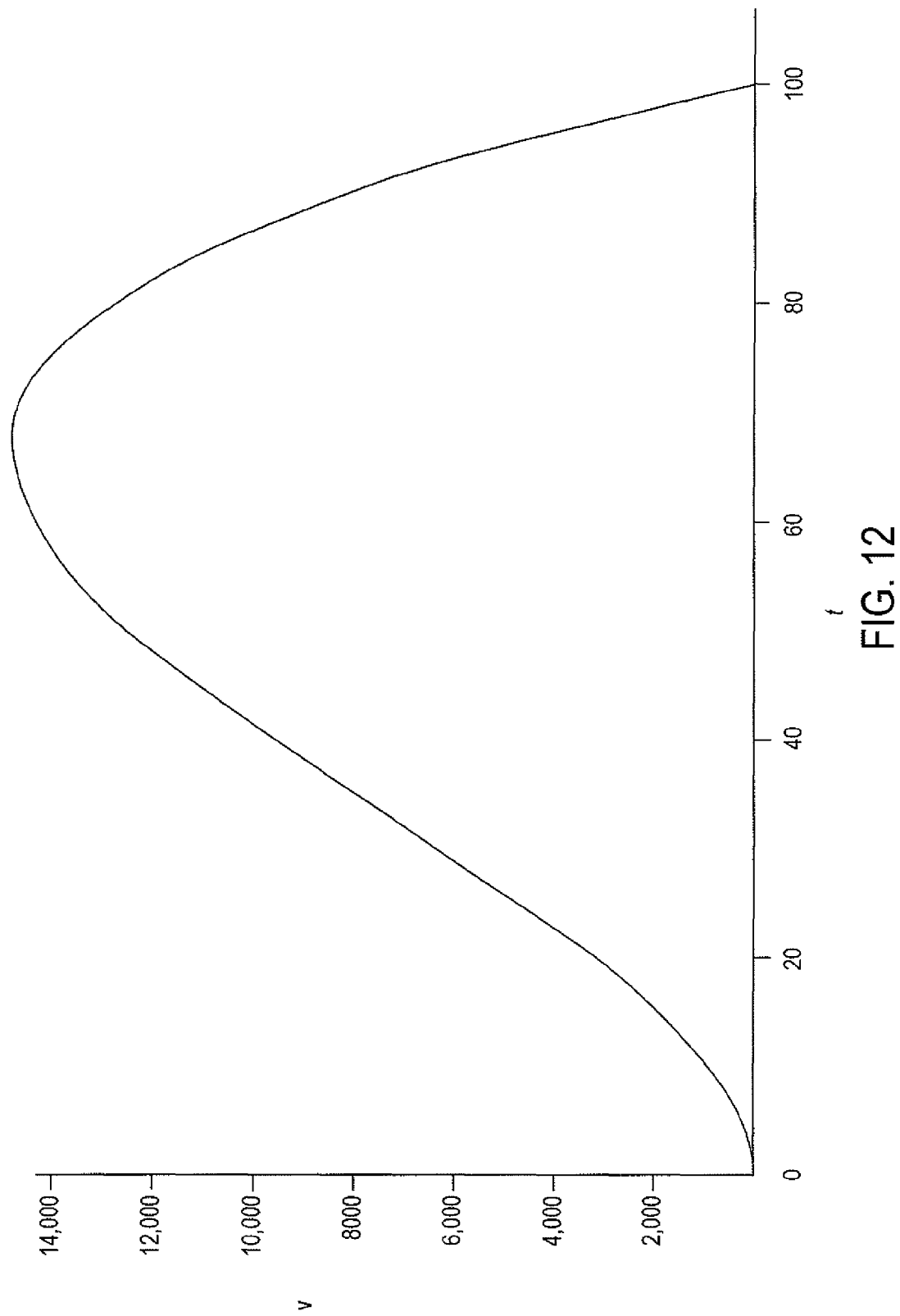
FIG. 12 shows a plot of the parameterized curve following a least-squares estimation of the parameter values.

Thus, returning to the sample data plotted in FIG. 9, when it is known that the response signal can be characterized by a third-degree polynomial, as discussed above, then the least-squares estimation method can be used to estimate the three parameters. For example, using the least-squares method, the schematical model for the response curve may be determined to be:

$$V(t) = -\tfrac{1}{3} t + 10 t^2 - 0.1 X^3$$

using the least-squares estimation method. FIG. 12 shows a plot of the parameterized curve following a least-squares estimation of the parameter values. In the case when a model for the response curve is known, the many data points collected during an experiment can be used, using the least-squares method, to generate accurate estimates of the constant parameters which, in turn, may lead to a far more accurate characterization of the sample than would otherwise be obtained by curve-smoothing, averaging, or other non-parametric approaches.

In the following discussion, a particular type of data-processing result referred to as the "earth response," produced from raw CSEM-survey data, is considered. This is one of many different types of data processing to which the currently disclosed data-processing methods and systems can be applied. In this case, a primary propagating time-varying EM field generated by a bipole transmission antenna towed by a survey vessel elicits the earth response, which is recorded as measurements of the secondary propagating time-varying EM fields induced by the primary propagating time-varying EM field. This system is both frequency selective and dispersive. Different frequency components of the propagating time-varying EM field are attenuated, within the CSEM-survey environment, to different degrees corresponding to different values of the attenuation parameter $\alpha$ discussed above, and different frequency components of the propagating time-varying EM field propagate at different velocities through the CSEM-survey environment. In general, the attenuation parameter $\alpha$ is greater for higher-frequency frequency components, and the velocity at which high-frequency secondary time-varying EM-field components propagate through the subterranean environment is much greater than for low-frequency components. As a result, in the time domain, high-frequency secondary-EM-field components appear relatively early in the signal, since later-arriving high-frequency components would generally have experienced significant attenuation and/or have traveled very long distances through resistive media. As a result, the low-frequency components of the secondary time-varying EM field appear predominantly later in an impulse response. Because the low-frequency components have traveled long distances without large attenuation, they generally contain information collected over much larger distances and therefore potentially show greater variation and provide more useful information for generating maps and images of the subterranean environment.

Figure 13:
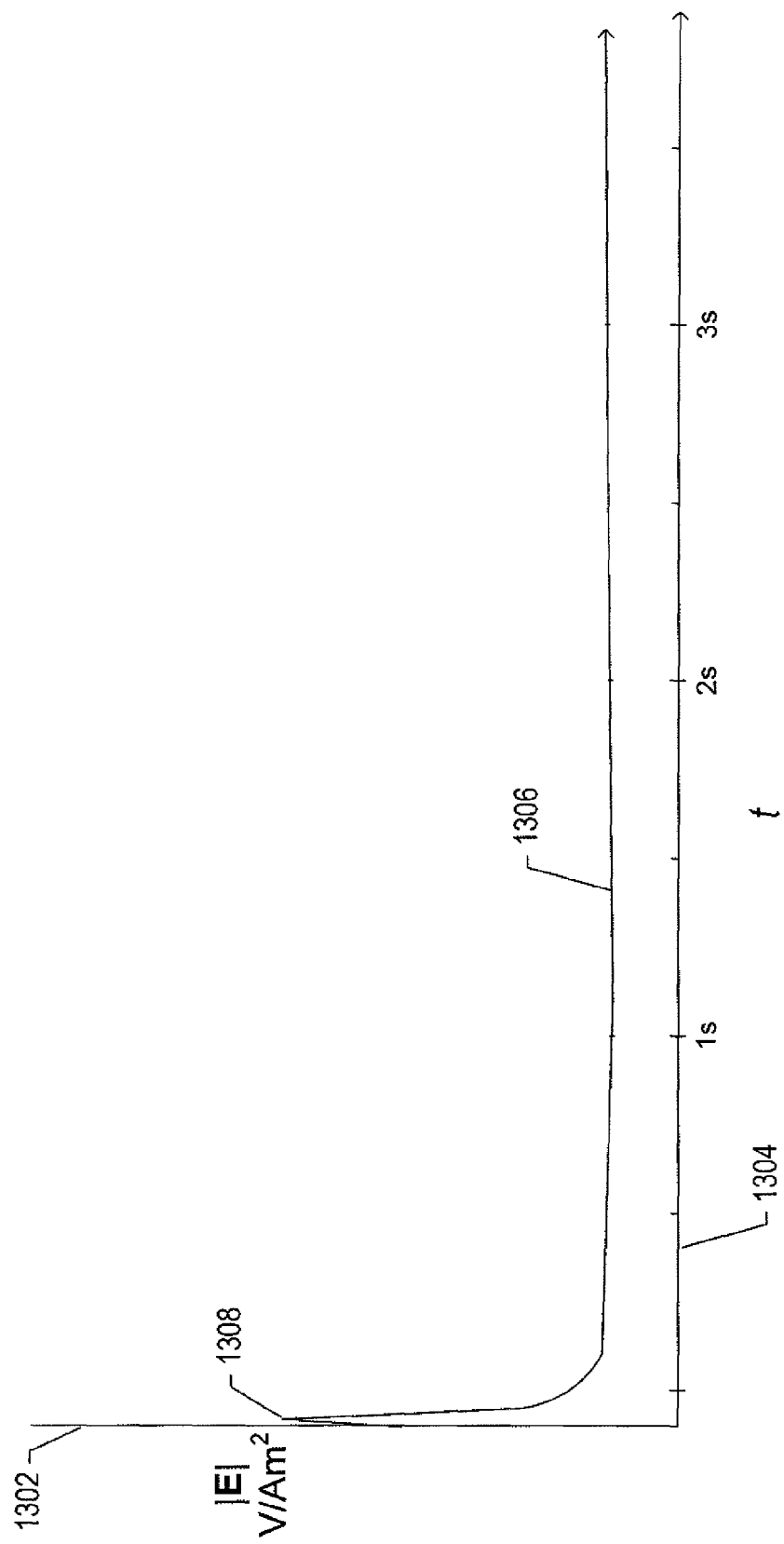
FIG. 13 illustrates a first portion of an impulse response measured by an EM sensor during CSEM-survey data collection.

FIG. 13 illustrates a first portion of an impulse response measured by an EM sensor during CSEM-survey data collection. The vertical axis represents the magnitude of the electric vector field, in units of volts per ampere-meters-squared (V/Am$^2$) 1302, and the horizontal axis 1304 represents time, in seconds. In this particular example, the sampling rate is 125 Hz and the sampling occurs over a 100-second interval. Thus, the data represented by curve 1306 in FIG. 13 are actually a sequence of discrete data points, including 125 data points for each 1-second interval along the horizontal axis. As can be seen in FIG. 13, there is a sharp initial peak 1308 in the impulse response and then a very long tail, less than 4% of which is shown in FIG. 13. The data set includes 100×125=12,500 data points. As is clearly apparent in FIG. 13, after the initial sharp peak, the data appears to vary quite slowly in time. However, as discussed above, information contained in those relatively slow variations is vital to downstream data processing. At the far end of the data set, not shown in FIG. 13, variation is low and the relative value of the information contained in the data is also relatively low.

Figure 14:
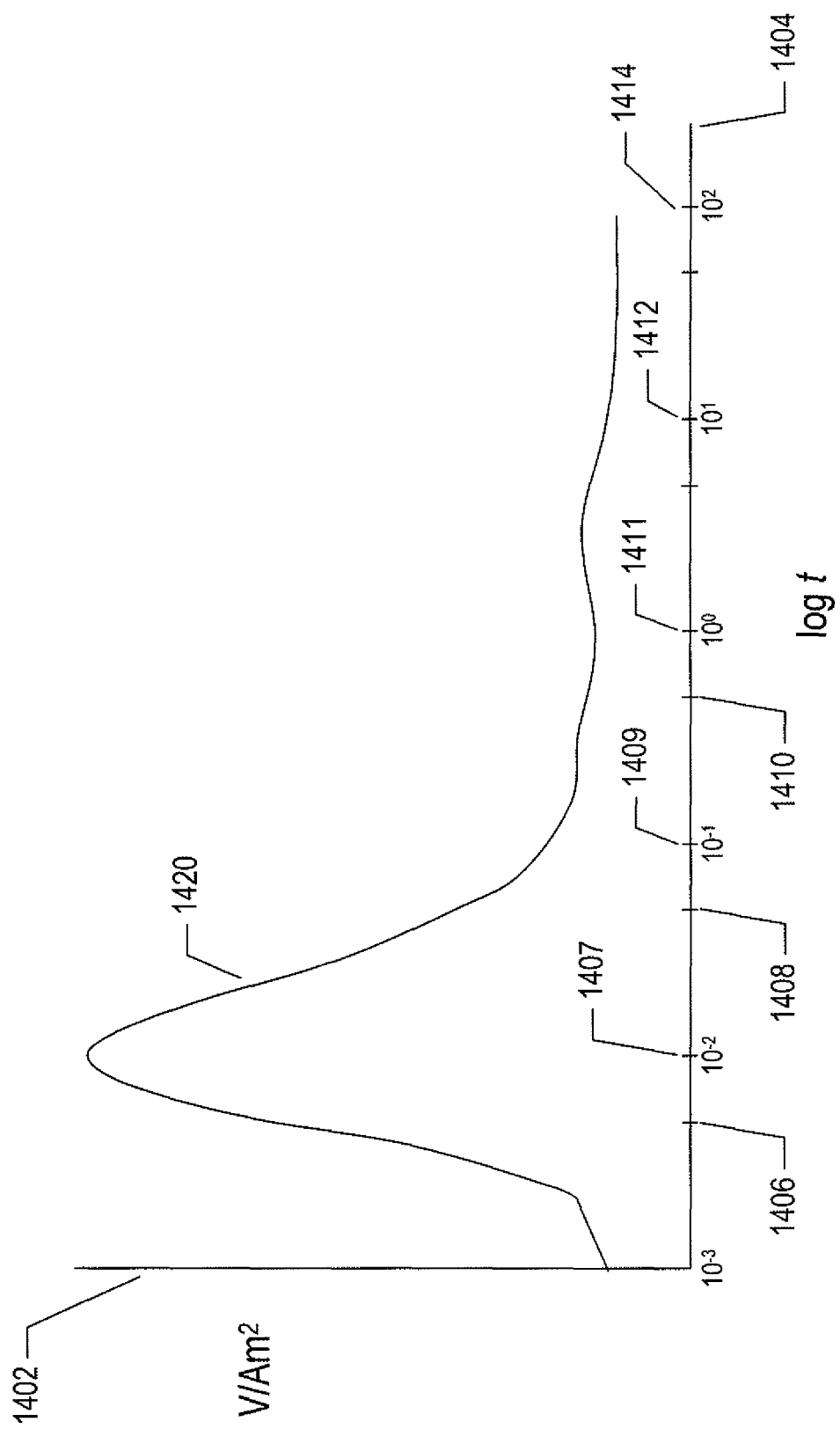
FIG. 14 illustrates the same data set used to generate FIG. 13, but plotted by the semi-log plotting technique.

FIG. 14 illustrates the same data set used to generate FIG. 13, but plotted by the semi-log plotting technique. In this case, the vertical axis 1402 remains the same electric vector-field magnitude axis as in FIG. 13, but the horizontal axis 1404 represents the logarithm of time, or log t, rather than t or time. Thus, point 1406 represents 0.005 seconds, point 1407 represents 0.01 seconds, point 1408 represents 0.05 seconds, point 1409 represents 0.1 seconds, point 1410 represents 0.5 seconds, point 1411 represents 1 second, point 1412 represents 10 seconds, and point 1414 represents 100 seconds. Thus, the entire data set is shown by curve 1420 in FIG. 14 in the semi-log plot.

Figure 15:
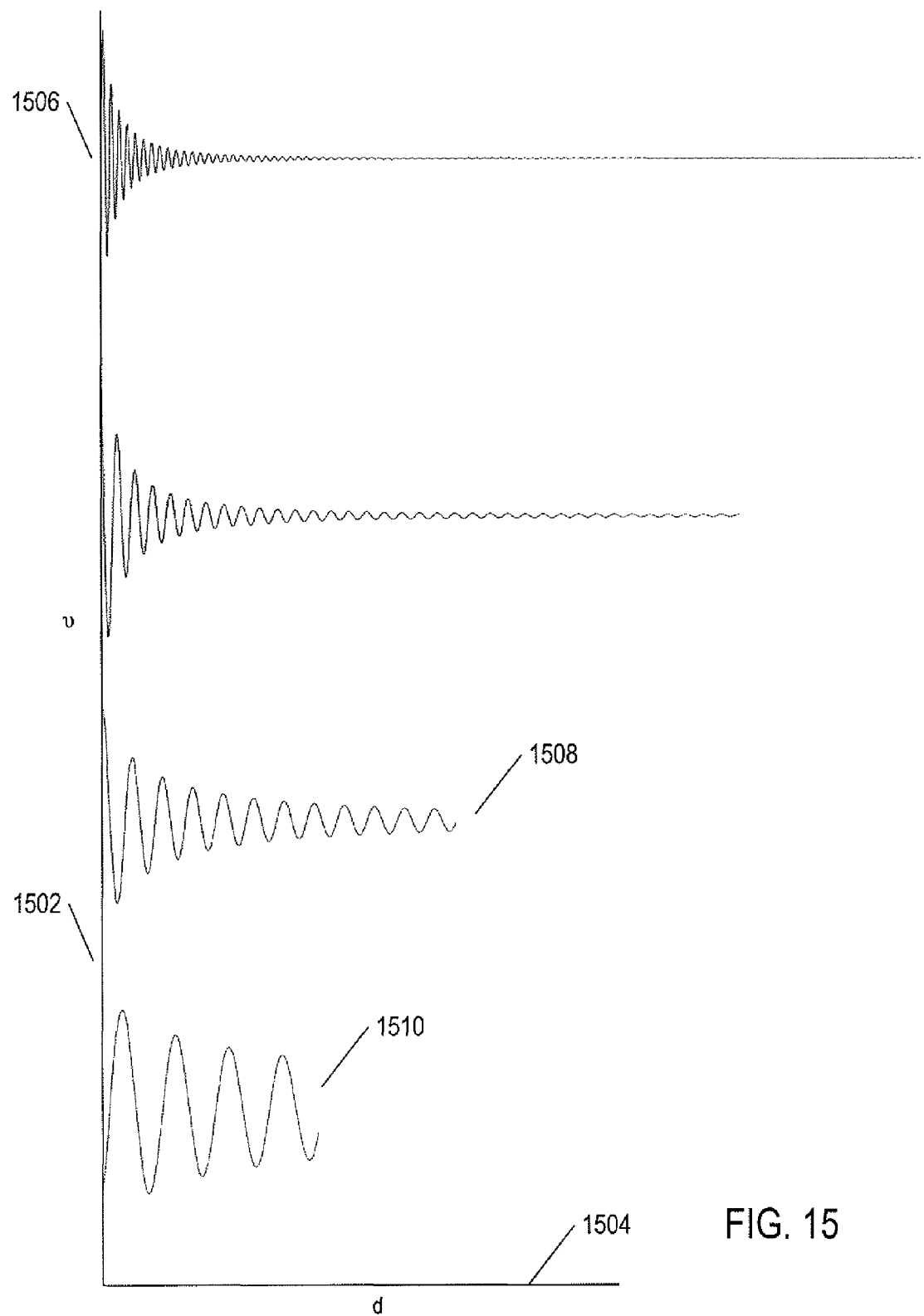
FIG. 15 illustrates certain characteristics of the propagation of time-varying EM fields within the CSEM-survey environment.

FIG. 15 illustrates certain characteristics of the propagation of time-varying EM fields within the CSEM-survey environment. The illustration is intended to show general attenuation and velocity characteristics, rather than provide accurate relative scaling of different frequency components of a wave induced during a CSEM survey. In FIG. 15, four different frequency components of an EM wave propagating through a CSEM-survey environment are shown. The vertical axis 1502 represents the frequency of the components and the horizontal axis 1504 represents the distance traveled by the component through the CSEM-survey environment in a unit-time interval. As illustrated in FIG. 15, relatively high-frequency components, such as component 1506, travel most quickly through the CSEM-survey environment but also attenuate most quickly. By contrast, lower-frequency components, such as components 1508 and 1510, travel relatively slowly through the CSEM-survey environment but attenuate gradually. In a CSEM survey, therefore, when a time-domain signal is recorded following an EM impulse, high-frequency components of the secondary propagating time-varying EM field to which the EM sensors respond appear relatively early, in time, because the high-frequency components have higher velocities in a CSEM-survey environment and because they tend to travel in more direct paths due to lower levels of interaction with environmental features. By contrast, lower frequencies appear later in the response, having traveled more slowly through the CSEM-survey environment. Because the lower-frequency components are less attenuated over distance, these lower-frequency components may interact to a greater degree with environmental features and therefore exhibit greater variation and larger variance in travel times than the higher-frequency components.

FIGS. 16A-16B further illustrate characteristics of different frequency components of propagating time-varying EM fields within a CSEM-survey environment. As shown in FIG. 16A, the velocity, plotted with respect to the vertical axis 1602, of a wave component increases with increasing frequency of the component, plotted with respect to the horizontal axis 1604. As shown in FIG. 16B, the magnitude of the attenuation or decrease in amplitude with time of a wave component, negatively valued, plotted with respect to the vertical axis 1606, increases with increasing frequency of the component.

Figure 17:
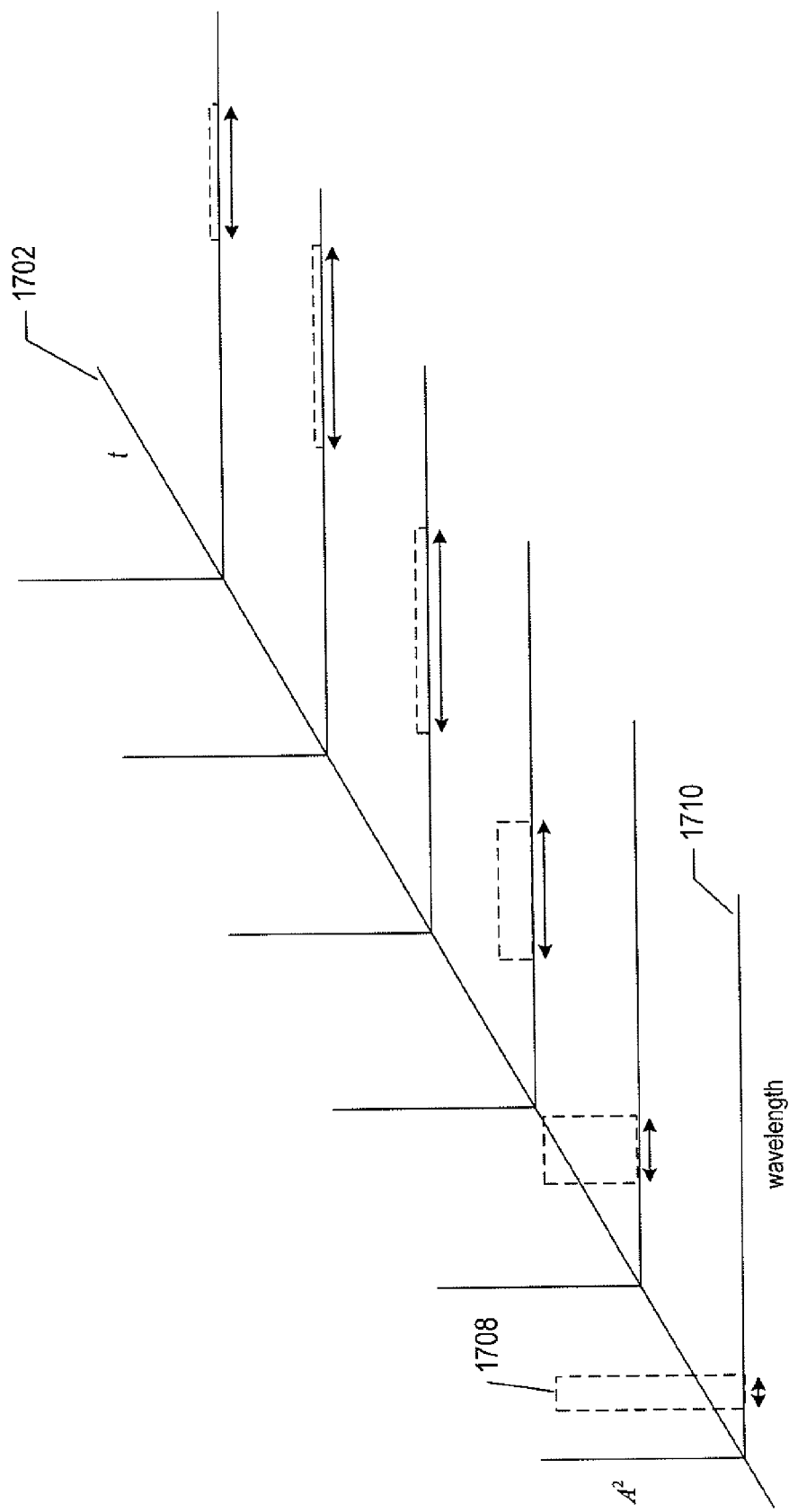
FIG. 17 illustrates characteristics of the earth-response signal recorded by EM sensors in a CSEM survey over time following an initial EM impulse.

FIG. 17 illustrates characteristics of the earth-response signal recorded by EM sensors in a CSEM survey over time following an initial EM impulse. In FIG. 17, time frames representing points in time are arranges along a time axis 1702. Each time frame includes a vertical axis representing the average squared amplitude of the frequency components and a horizontal axis that represents the wavelengths of the frequency components. The range of wavelengths of the components of the response at a particular instant in time is represented by a segment of the horizontal axes between two vertical dashed lines and the height of the vertical dashed lines represents, or is proportional to, the average squared amplitude of those frequency components. Thus, the area within the dashed rectangles in each time frame in FIG. 17 is proportional to the energy of the secondary propagating time-varying EM field at points in time following the initial EM impulse. Initially, the response signal includes mostly high-frequency components with relatively high amplitudes, as indicated by the dashed rectangle 1708 in the first time frame 1710. Over time, the average frequency of wave components increases and the wavelength range of the components broadens, while the amplitudes of the components of the wave decrease. However, the total energy, represented by the area within the dashed rectangles, decreases relatively slowly, because, as discussed above, the lower-frequency components, which increasingly dominate the response signal over time, attenuate less quickly than the higher-frequency components.

According to the Nyquist-Shannon sampling theorem, a band limited analog signal can be perfectly reconstructed from an infinite sequence of samples at a sample rate of twice the highest frequency component of the signal. The assumptions on which the theorem is based represent ideal conditions not present in actual signal-sampling environments and instrumentation. However, in general, for an oscillating signal, the sampling rate needed to reconstruct the signal is generally proportional to some constant times the highest-frequency component of the signal. However, the needed sampling rate also depends on the range of frequencies of components spanned by the signal or, in other words, the frequency span of the signal bandwidth. The greater the frequency span, the greater the amount of information potentially carried by the signal and thus the greater the sampling rate needed in order to accurately record and reconstruct the signal. As a result, the sampling rate needed for an earth-response curve recorded during a CSEM survey, whether in the time domain or the frequency domain, is generally non-uniform over the recording time or the range of sampled frequencies. In fact, the needed sampling rate may be decidedly non-linear with respect to time or frequency. Clearly, returning to FIG. 17, because higher-frequency components dominate the initial portion of a time-domain earth response, a relatively high sampling rate is needed for the initial portion of the earth-response curve. However, although the average frequency of the wave components decreases, over time, the bandwidth of the earth-response signal generally increases, so that the needed sampling rate remains relatively high despite the decrease in average frequency of the wave components. In latter portions of the signal, as can be seen in FIGS. 13 and 14, the average frequency of the components is relatively low and constant and the bandwidth narrows, so that the tail portion of the response curve contains relatively little information and therefore needs only a relatively low sample rate for accurate recording and reconstruction.

The data recorded by a single EM sensor in a CSEM survey, d(t), where t is time, can be modeled as the convolution of the EM-source signal, or primary propagating time-varying EM field, s(t), and the earth response, g(t):

$$d(t) = \int_0^\infty s(t-\tau)g(\tau)d\tau.$$

In the case of an impulse EM source, where $s(t)=\delta(t)$, the convolution simply selects the earth response at each given time as the data recorded at that time, or:

$$d(t)=g(t).$$

In a discrete case, with sampling at N intervals:

$$d_n=g_n$$

and, when noise is considered:

$$d_n=g_n+v_n.$$

Figure 18A:
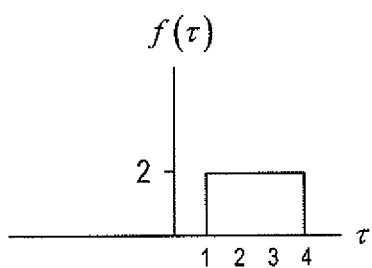
FIGS. 18A-18P illustrate convolution of two simple signals.
Figure 18B:
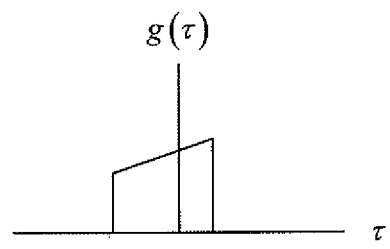
Figure 18C:
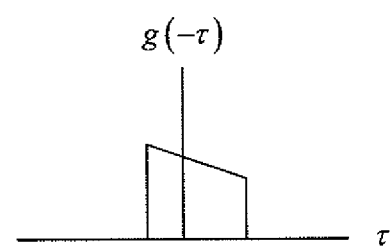
Figure 18D:
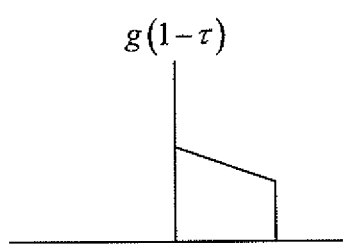
Figure 18E:
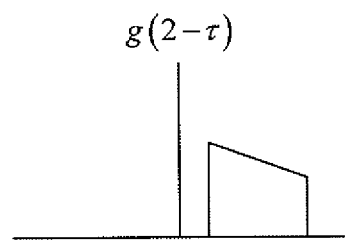
Figure 18F:
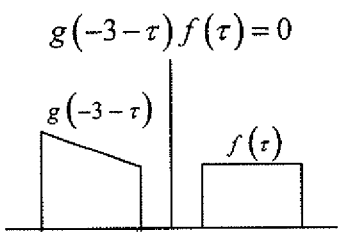
Figure 18G:
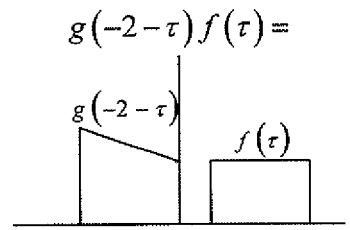
Figure 18H:
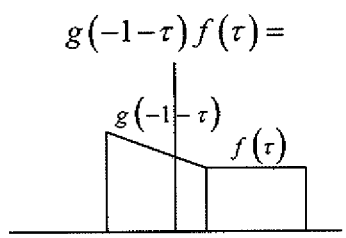
Figure 18I:
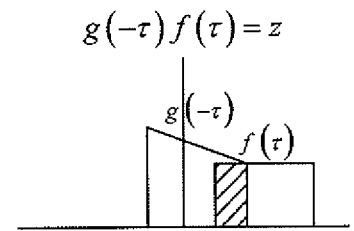
Figure 18J:
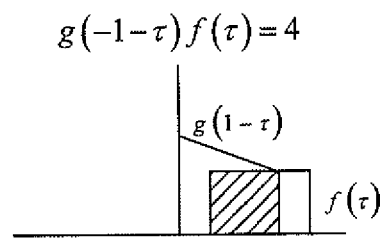
Figure 18K:
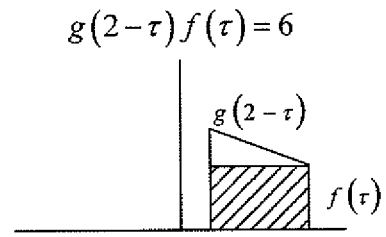
Figure 18L:
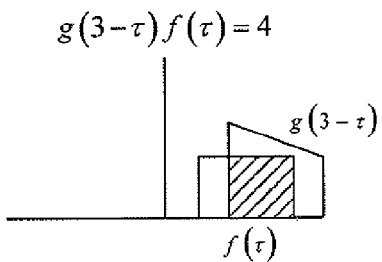
Figure 18M:
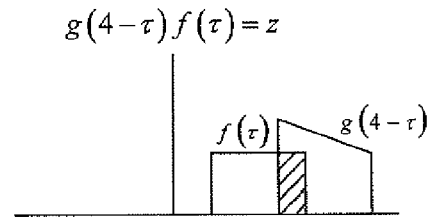
Figure 18N:
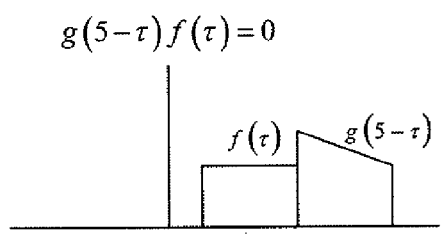
Figure 18O:
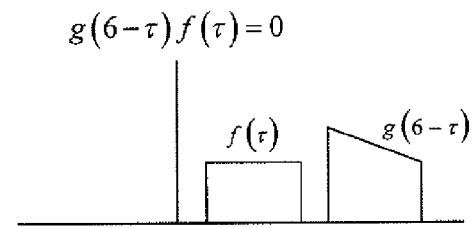
Figure 18P:
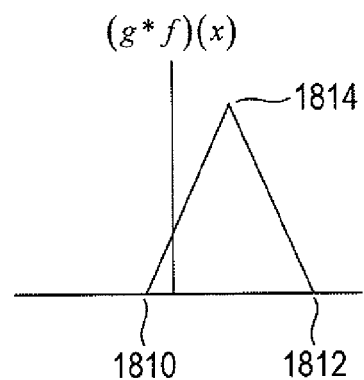

FIGS. 18A-18P illustrate convolution of two simple signals. FIG. 18A represents a first signal, $f(\tau)$, and FIG. 18B illustrates the second signal $g(\tau)$. FIGS. 18C-18P illustrate computation of the convolution of these two signals.

$$\int_0^\infty f(\tau)g(t-\tau)d\tau = \int_0^\infty g(\tau)f(t-\tau)d\tau = (g*f)(x)$$

In a first step, illustrated in FIG. 18C, signal $g(\tau)$ is rotated about the vertical axis, equivalent to a transformation of $g(\tau)$ to $g(-\tau)$. As shown in FIGS. 18D-18E, the rotated function $g(-\tau)$ can be shifted along the horizontal axis by adding an instantaneous time value t, $g(t-\tau)$, and changing the time value t to shift the position. As illustrated in FIGS. 18F-18O, the convolution interval can be thought of as moving the rotated, translatable function $g(t-\tau)$ across the horizontal, or time, axis from minus infinity to positive infinity. For non-infinite function, such as $f(\tau)$ and $g(\tau)$ in the current example, is sufficient to translate $g(t-\tau)$ from a first position in which $g(t-\tau)$ does not overlap $f(r)$, shown in FIG. 18H, to a second position in which $g(t-\tau)$ does not overlap $f(\tau)$, as shown in FIG. 18N. At each point along the translation, the value of the convolution is the area common to both $g(t-\tau)$ and $f(\tau)$, with the common areas crosshatched in FIGS. 18G-18M. FIG. 18P illustrates the convolution function generated by this translation process. The point 1810 in FIG. 18P represents the product $g(-1-\tau)f(\tau)$ at the point in the translation illustrated in FIG. 18F, and the point 1812 represents $g(5-\tau)f(\tau)$ at the point in the translation illustrated in FIG. 18N. The apex point 1814 represents the point of maximum overlap between the two signals, $g(2-\tau)f(\tau)$, illustrated in FIG. 18K. Convolution of a Dirac-delta function $\delta(t)$ and an arbitrary earth response $g(\tau)$ simply reproduces $g(\tau)$.

In the following, the EM-sensor data, earth response, and other related quantities are represented as vectors. In the presence of noise, the EM-sensor data d is modeled as:

$$d=g+v$$

where v is a noise vector and the lengths of vectors d, g, and v=M.

With 0-mean white noise, the best estimate of g, $\hat{g}$, is:

$$\hat{g}=d.$$

When the EM-sensor data d is treated according to the above model, and when there is no parametric expression for modeling the earth response g, as is generally the case, there is a single EM-sensor data point $d_i$ for each corresponding determined point of the earth response $g_i$. In other words, the number of significant degrees of freedom of the earth response matches the number of data points across the entire time or frequency interval over which the data is collected. However, as discussed above, because of the dependence of attenuation on frequency and because of the varying bandwidth of the earth response over time or frequency, the needed sampling rate, or number of data points per time or frequency interval, varies with time or frequency. While the number of degrees of freedom of the earth response may match or be relatively proportional to the number of data points in initial portions of the EM-sensor data, the number of data points in later intervals, at the tail of the recorded data, greatly exceeds the degrees of freedom associated with the earth response which, as discussed above, contains relatively little information. Therefore, the above model for the EM-sensor data and earth response is not unlike the example illustrated in FIG. 9. Unlike that example, however, there is no simple polynomial model for the earth-response curve.

The currently disclosed methods and systems provide for earth-response parameterization in order to more closely match the sampling frequency with the significant degrees of freedom estimated for the earth-response curve across an entire data-collection time, for time-domain data, or across an entire frequency spectrum, for frequency-domain data. One currently disclosed approach involves a non-linear decimation of the earth-response curve, which is equivalent to a parameterization of the curve that decreases the discrepancy between data collected at uniform time intervals and the information content of the earth response over the time of data collection. In one approach, the earth response is normalized in time so that the independent time variable ranges within the range [0,1]. The normalized earth-response curve is then transformed according to a non-linear mapping of the normalized linear independent-variable space to a quasi-logarithmic independent-variable space according to the independent-variable remapping function:

$$x' = f(x, \lambda) = \frac{e^{\lambda x} - 1}{e^{\lambda} - 1}$$

where $\lambda$ is a parameter of the independent-variable remapping function. When the value of $\lambda$ is positive and approaches 0, the mapping reduces to a linear sampling. As the value of $\lambda$ increases, the mapping approaches logarithmic sampling.

Figure 19A:
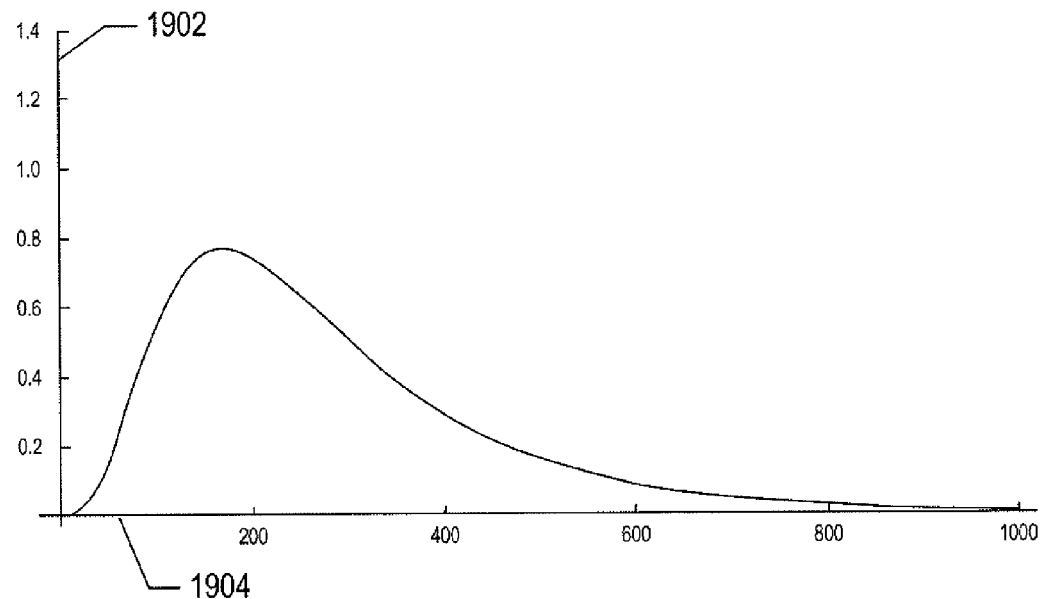
FIGS. 19A-19N illustrate a quasi-logarithmic mapping approach to decimation of the earth-response curve.
Figure 19B:
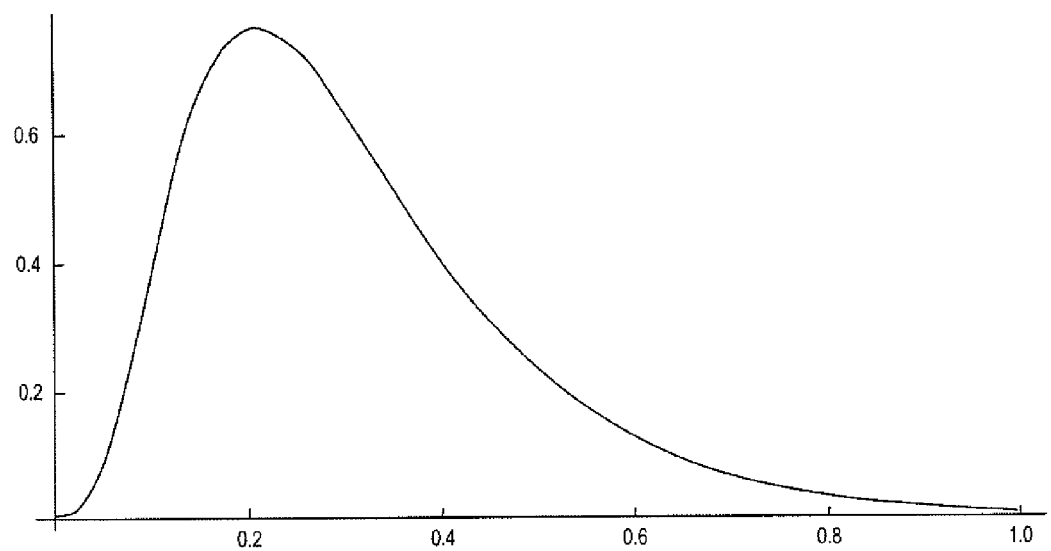
Figure 19C:
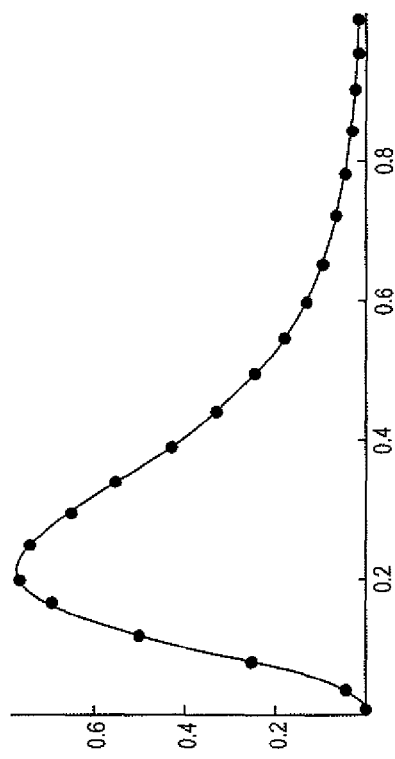
Figure 19D:
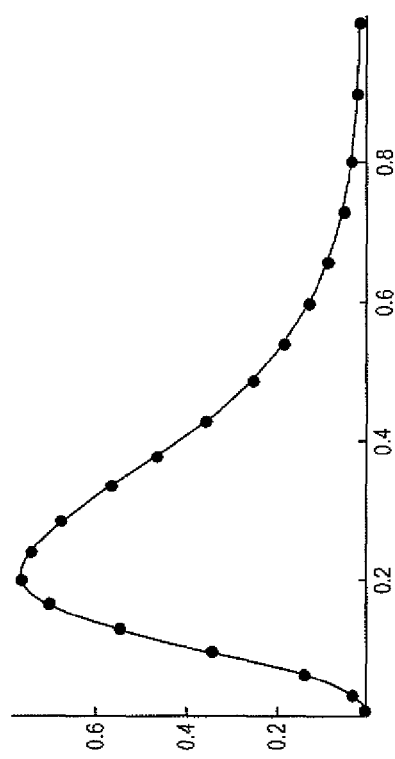
Figure 19E:
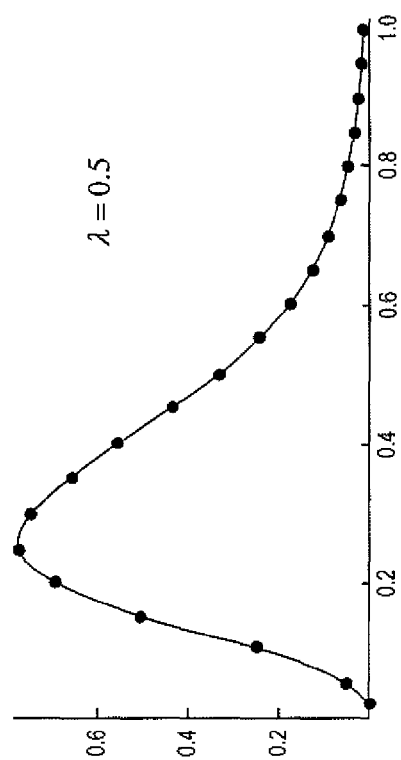
Figure 19F:
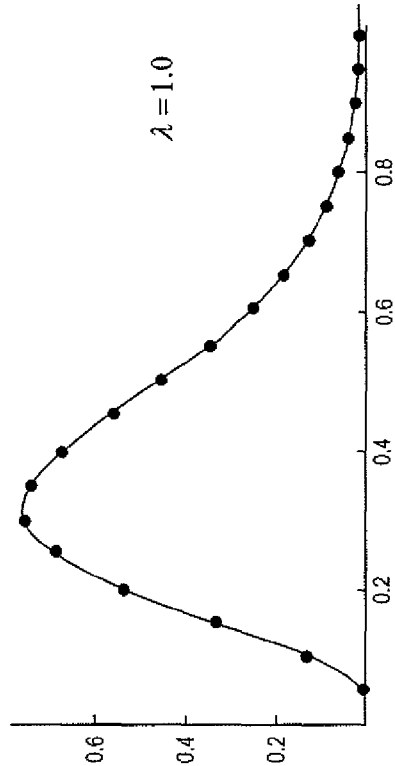
Figure 19G:
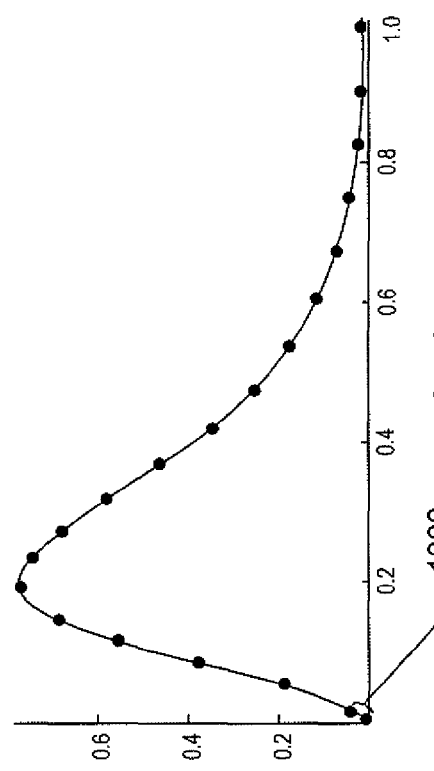
Figure 19H:
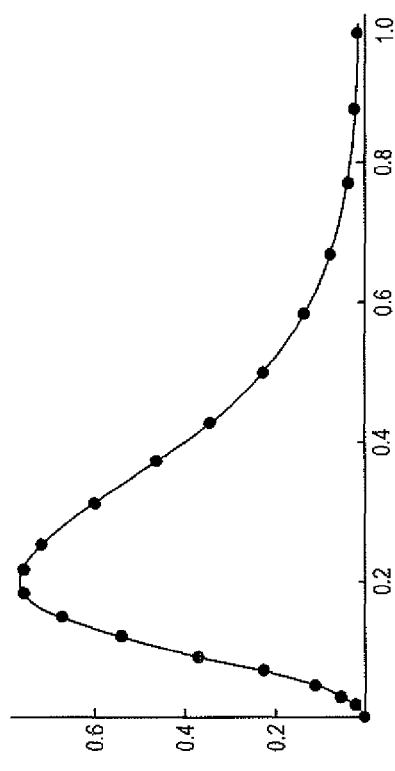
Figure 19I:
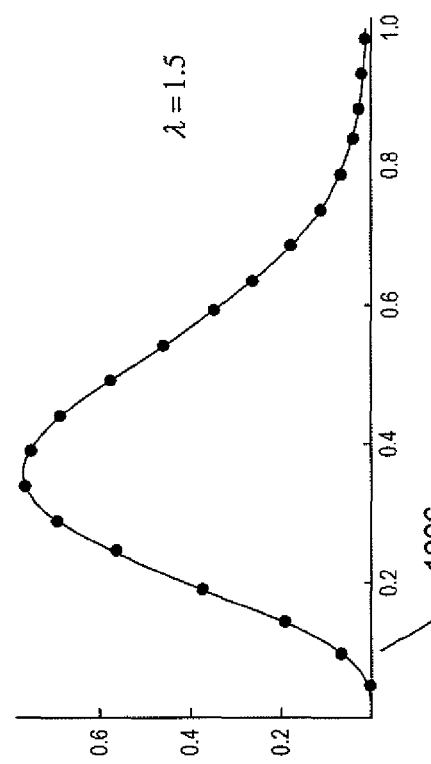
Figure 19J:
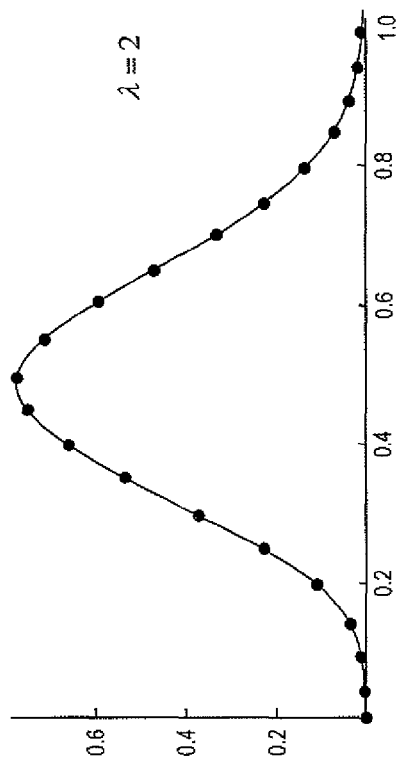
Figure 19K:
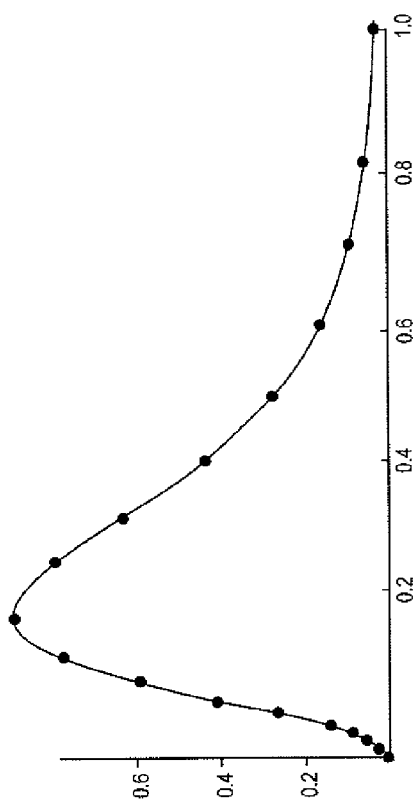
Figure 19L:
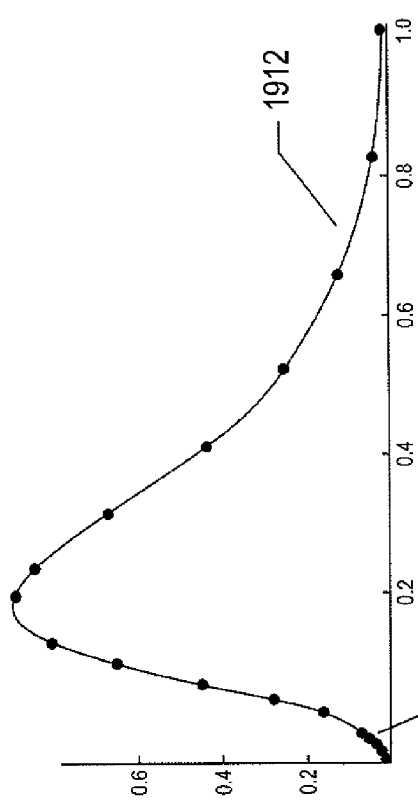
Figure 19M:
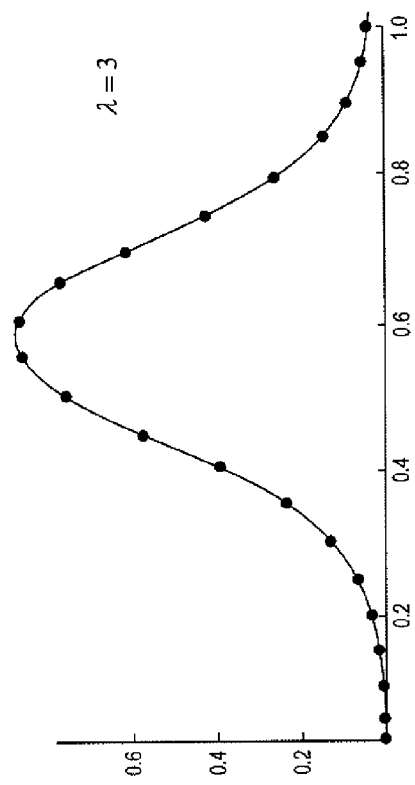
Figure 19N:
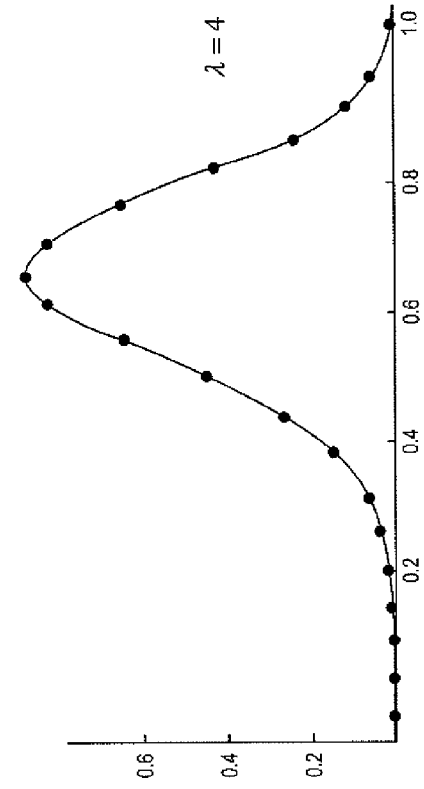

FIGS. 19A-19N illustrate a quasi-logarithmic mapping approach to decimation of the earth-response curve. FIG. 19A shows a hypothetical earth response curve, with a voltage or amplitude value plotted with respect to the vertical axis 1902 over 1,000 units of time, plotted with respect to the horizontal axis 1904. In a first step, mentioned above, the earth-response curve is normalized with respect to the independent variable, as shown in FIG. 19B.

FIG. 19C shows the normalized earth-response curve of FIG. 19B after independent-variable remapping using the function f(x,λ). For this remapping, the constant λ has a value of 0.5. Because λ has a relatively small positive value, the remapping is close to the original linear normalized response curve, shown in FIG. 19D for comparison. In FIG. 19C, dots or filled circles represent a uniform sampling, with respect to the independent variable, in the remapped response curve. These sample points are translated back to the normalized curve shown in FIG. 19D. While the sampling is uniform in the remapped curve, the sampling becomes somewhat non-uniform when translated back to the normalized earth-response curve shown in FIG. 19D. Using the value λ=0.5 for independent-variable remapping, the sample points are not significantly redistributed when translated back to the normalized earth-response curve shown in FIG. 19D. FIGS. 19E-19N illustrate uniform sampling of the remapped curves compared to the original normalized curve with increasing λ values for the remapping function f(x, λ). Already, with a λ value of 1.5, as shown in FIG. 19G, the distribution of sampling points along the corresponding normalized curve, shown in FIG. 19H, is noticeably different than the distribution of sampling points for the independent-variable-remapped curve in FIG. 19G. For example, note that the distance along the curve between the first two sample points 1906 in a quasi-logarithmic curve 19G is significantly greater than the distance between the first two sample points 1908 in the normalized curve. As the value of λ increases, the disparities in the distribution of sample points in the remapped and normalized curves increase. The net effect is to more frequently sample the initial portions of the curve and less frequently sample the outer portions of the curve. For example, compare the earth-response curve in FIG. 19C with the earth-response curve in FIG. 19M. In FIG. 19C, there are six sample points up to and including the peak of the curve, while in FIG. 19M there are 13 sample points up to and including the peak of the curve. These sample point values are translated back to the original, normalized curve, in FIG. 19N, where it can be seen that the original normalized curve is far more frequently sampled in the initial portions of the curve 1910 than in the tail of the curve 1912 using the translated uniform sample points from the independent-variable-remapped curve shown in FIG. 19M.

Next, a model for extracting the decimated response curve from EM-sensor data is discussed. In general, decimation using the above-discussed remapping function $f(x,\lambda)$ results in far fewer sample points over the domain of the independent variable when the decimated response curve is uniformly sampled. A decimated response-curve vector of length K, where K<<M is denoted g'. The full response vector g can be reconstructed from the decimated response vector g' by:

$$g = Pg'$$

Where P is an M×K linear interpolation matrix. Thus, according to the above-discussed model for the EM-sensor data:

$$d = Pg' + v$$

and so an estimate for the decimated response vector can be obtained using a least-squares approach by:

$$\hat{g}' = (P^T P)^{-1} P^T d.$$

The above model assumes an impulse EM source but, in general, a continuous EM source is used in CSEM surveys. A continuous EM source can be modeled as:

$$d = S^T g + v.$$

where $S^T$ is an M×M signal convolution matrix. The non-decimated response curve can be estimated from the data vector by:

$$\hat{g} = (SS^T)^{-1} Sd.$$

The estimate for the decimated response vector can therefore be obtained from the data, using a least-squares method, by:

$$\hat{g}' = (P^T SS^T P)^{-1} P^T Sd.$$

The above-described models and estimates represent certain of many different possible methods for extracting decimated response curves from EM-sensor data.

FIGS. 20A-20B and 21A-21B illustrate mapping functions and corresponding inverse mapping functions. In general, an independent-variable mapping function, with the independent variable designated as t, has the form:

$$t' = f(t).$$

One example of a mapping function, which represents a limiting case of the above-discussed parameterized mapping function, is:

$$t' = \log(t).$$

This mapping function is plotted in FIG. 20A. A table for selected values of t and t' computed by the mapping function is provided in FIG. 20B. Generally, for a continuously differentiable function without local minima and maxima, such as the above-discussed mapping function plotted in FIG. 20A, there is a unique inverse function. The inverse of function $f(t)$ is generally denoted $f^{-1}(t')$ and reverses the operation represented by the function $f(t)$:

$$t = f^{-1}(f(t)) = f^{-1}(t').$$

The inverse function for t'=log(t) is:

$$t = e^{t'}.$$

The inverse function $t=e^{t'}$ is plotted in FIG. 21A, and a table of t', t pairs computed from this function is provided in FIG. 21B. In many cases, one can find a closed-form, analytical expression for the inverse of a closed-form function. In other cases, the inverse function can be numerically calculated from tables, such as those shown in FIGS. 20B and 21B. Note that the table shown in FIG. 21B is obtained by reserving the columns of the table shown in FIG. 20B. The inverse for the remapping function $f(x,\lambda)$ is used in the subsequent discussion of an example data-processing method that incorporates a non-linear response-curve parameterization for extracting earth-response curves from CSEM-survey data.

FIGS. 22A-22E illustrate, using control-flow diagrams, a data-processing method incorporated into CSEM-survey data-processing systems for extracting accurate earth responses from EM sensors. These control-flow diagrams use the vector notation used in the previous discussion.

Figure 22A:
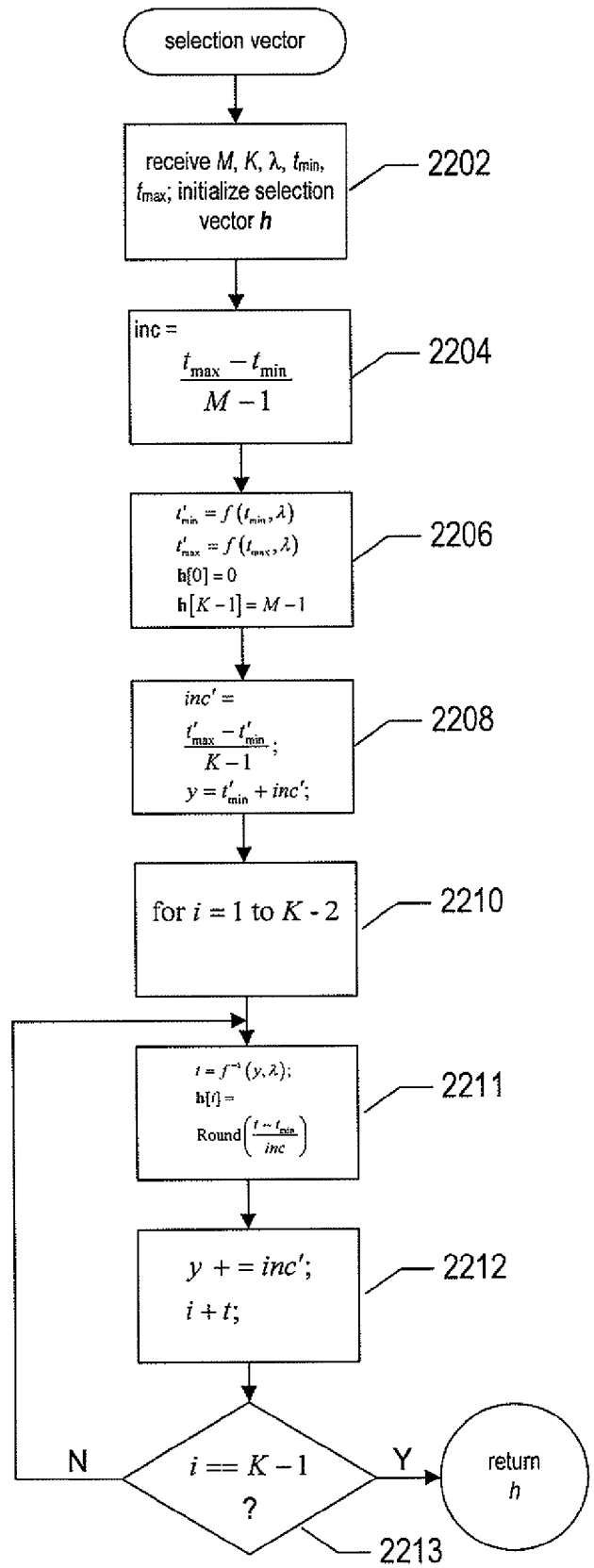
FIGS. 22A-22E illustrate, using control-flow diagrams, a data-processing method incorporated into CSEM-survey data-processing systems for extracting accurate earth responses from CSEM-survey EM sensors.

FIG. 22A illustrates computation of a selection vector which can be used to generate a decimated earth response from a non-decimated, linear earth response. In step 2202, the lengths of the non-decimated earth response, M, and a desired length for the decimated response, K, is received along with a value for the independent-variable remapping function parameter $\lambda$ and the minimum and maximum values for the independent variable $t_{min}$ and $t_{max}$. Also, in step 2202, a selection vector h is allocated and initialized. In step 2204, the local variable inc is computed as:

$$inc = \frac{t_{max} - t_{min}}{M - 1}.$$

The local variable inc represents the sampling interval for the undecimated response. Next, in step 2206, the minimum and maximum values for remapped independent variables are computed using the remapping function $f(x,\lambda)$ and the initial and final values in the selection vector h are set to 0 and M−1, respectively. In step 2208, the local variable inc' is computed analogously to computation of the local variable inc in step 2204, and the local variable y is set to the value $t'_{min}$+inc'. Then, in the for-loop of steps 2210-2213, the remaining elements of the selection vector h are computed. An element is computed by remapping a next computed t' to a corresponding t and then computing the index of the undecimated response corresponding to the next considered t' value and placing the computed index in the next element of the selection vector h. The computed selection vector h therefore effectively constitutes a mapping from the undecimated earth response g to the decimated earth response g'.

Figure 22B:
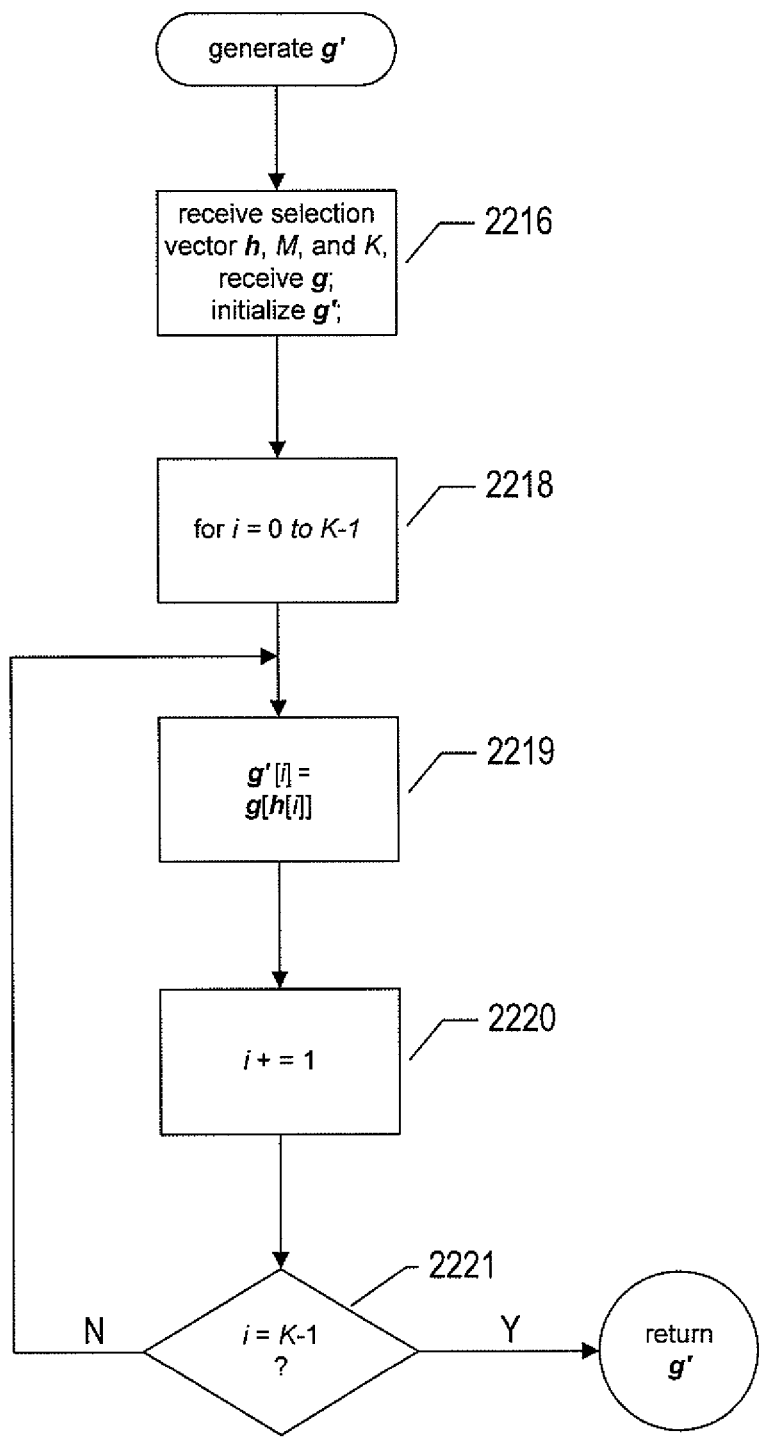

FIG. 22B illustrates generation of a decimated earth response g' from an undecimated earth response g. In step 2216, a selection vector h computed by the selection-vector-generation method illustrated in FIG. 22A is received along with the lengths of the undecimated and decimated earth response, M and K, and the undecimated earth response g. Then, in the for-loop of steps 2218-2221, the values for the decimated earth response g' are selected from the undecimated earth response g using the mapping incorporated in the selection vector h.

Figure 22C:
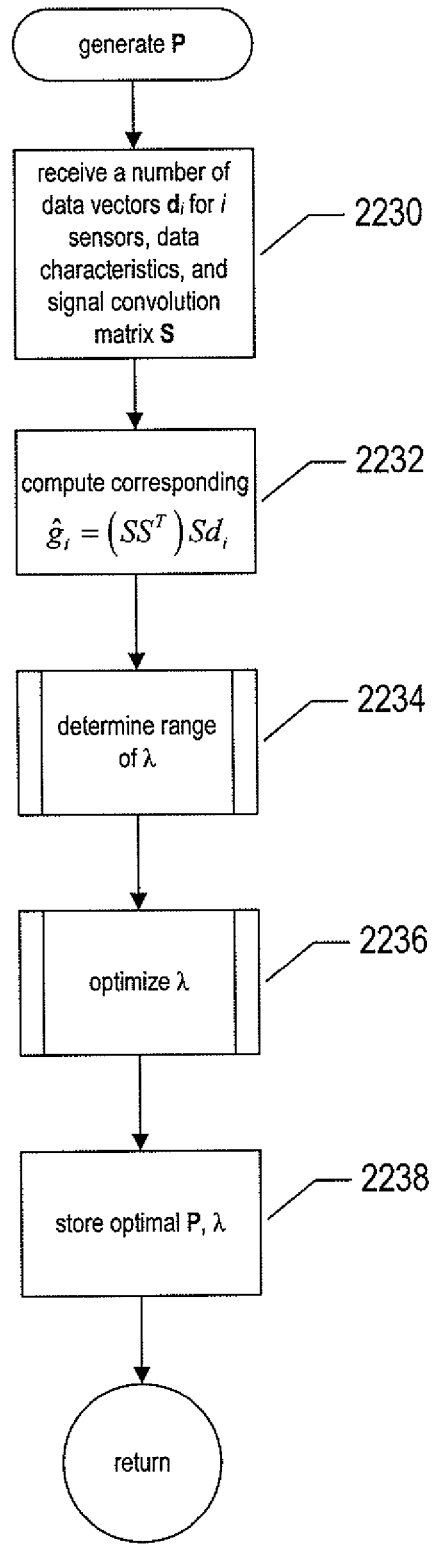

FIG. 22C illustrates a method for generating the interpolation matrix P for use in estimating earth responses from multi-sensor CSEM-survey data. In step 2230, a number of data vectors $d_i$ for a number i of EM sensors is received along with a signal convolution matrix S and various characteristics of the data. Then, in step 2232, the earth responses for each data vector are estimated. Note this estimation does not involve the least-squares method. In step 2234, a range of possible $\lambda$ values for the remapping function $f(x,\lambda)$ is determined. In step 2236, an optimization process is used to select the optimal $\lambda$ for parameterization of all of the data vectors. Finally, in step 2238, the optimal $\lambda$ and interpolation matrix P are stored.

Figure 22D:
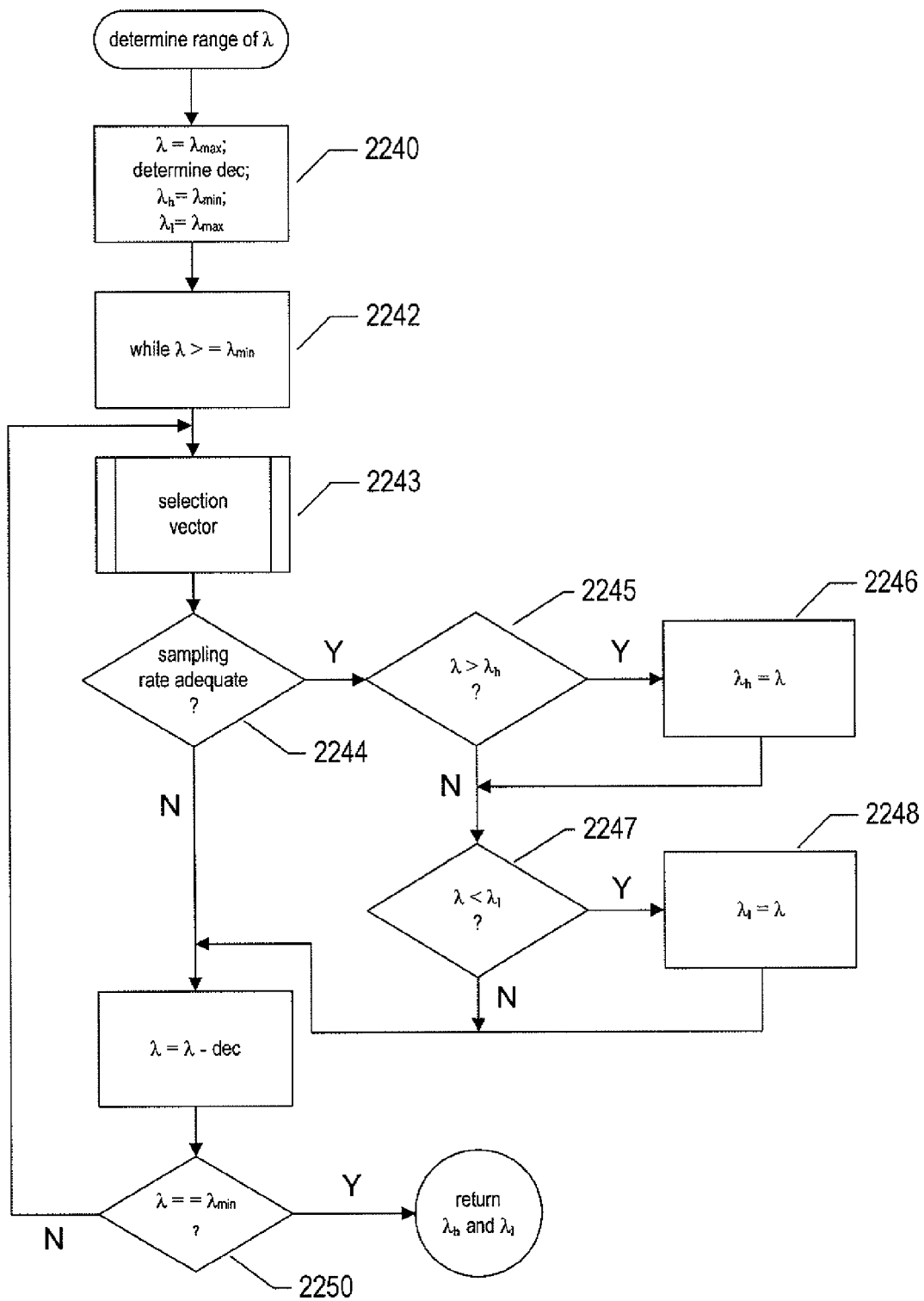

FIG. 22D illustrates determination of the range of possible $\lambda$ values carried out in step 2234 of FIG. 22C. In step 2240, the local variable $\lambda$ is set to a maximum possible $\lambda$, $\lambda_{max}$, a local variable dec is determined, and local variables $\lambda_h$ and $\lambda_l$ are set to $\lambda_{min}$ and $\lambda_{max}$, respectively, where $\lambda_{min}$ is a minimum possible value for $\lambda$. Then, in the while-loop of steps 2242-50, a selection vector corresponding to the current value stored in local variable $\lambda$ is created for each considered value of $\lambda$ and, when the sampling rate is adequate over the entire independent-variable domain, as determined in step 2244, the values of $\lambda_h$ and $\lambda_l$ may be accordingly adjusted so that, at the end of the while-loop of steps 2242-2250, a range of $\lambda$ values from $\lambda_l$ to $\lambda_h$ is determined over which the sampling rates corresponding to the selection vectors with different $\lambda$ values is adequate according to Nyquist-Shannon-type considerations. The sampling rate is adequate for a segment of the independent-variable domain when the sampling rate, applied to EM-sensor data for the domain segment, is adequate for reconstruction of the signal by Nyquist-Shannon-type considerations. The adequacy of the sampling rate may be evaluated with respect to one or more of the data vectors $d_i$ received in step 2230.

The optimization of $\lambda$ carried out in step 2236 is a least-squares optimization that can be characterized as:

$$S(\lambda) = \|\hat{g}_i - P_\lambda \hat{g}_i\|^2$$

where $P_A$=interpolation matrix for decimation based on $f(x,\lambda)$;

$$\hat{g}_i = (SS^T)^{-1} S d_i;$$

$\hat{g}_i$ is generated from $\hat{g}_i$ using selection vector computed for $\lambda$; and $\lambda$ in $[\lambda_e, \lambda_h]$, $$\lambda = \underset{\lambda}{\text{avgmin}} S(\lambda).$$

Figure 22E:
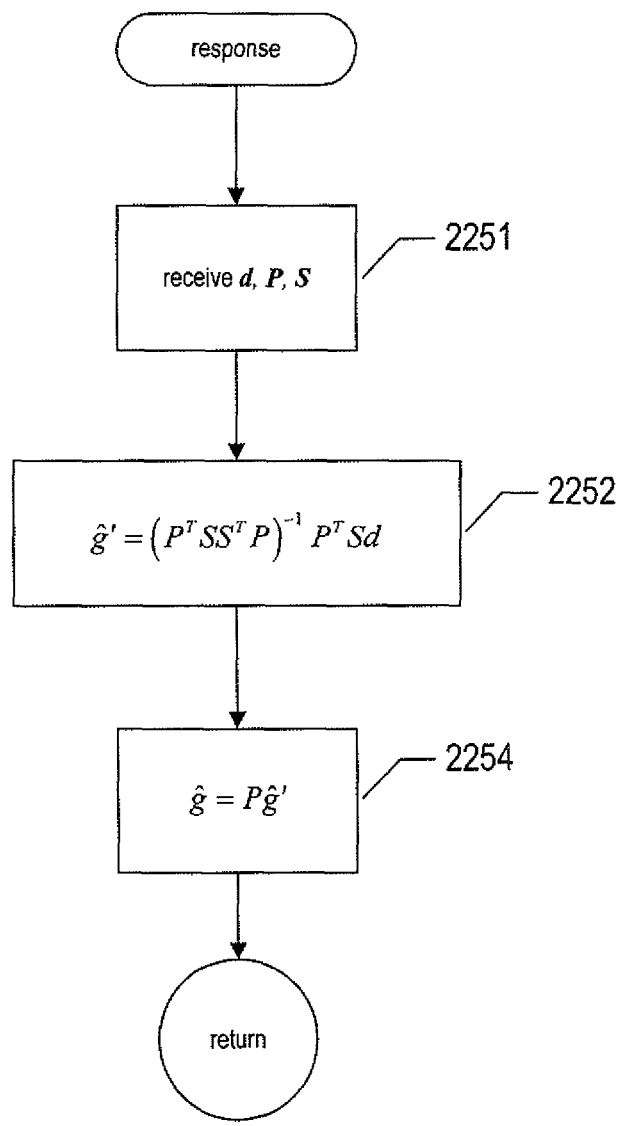

Finally, FIG. 22E illustrates computation of estimated earth response using a least-squares method and a decimated earth response. In step 2251, a data vector d, an interpolation matrix P, and a signal convolution matrix S are received. In step 2252, an estimate for a decimated earth response is computed and, in step 2254, the full undecimated earth response corresponding to the estimated decimated earth response is computed.

There are many different alternative methods for decimating or parameterizing an earth response. As one example, using wave-component-attenuation data and wave-component-velocity data for CSEM-survey environments, the maximum frequencies of wave components at each instance of time or at each frequency can be computed, from which a sampling rate can be, in turn, computed using Nyquist-Shannon considerations. The decimation/parameterization of the earth response can then be made to correspond to the computed sampling frequency at each point of time in a data set. Similar information can be obtained from wave length and short-time Fourier transforms that are used to analyze recorded signals. Another approach is to iteratively decimate or parameterize an earth response while the decimated or parameterized earth response can still be used to accurately reconstruct the corresponding non-decimated earth response in order to find a minimal but sufficient number of parameters, or sample points, for the decimated earth response. In addition, many different types of remapping functions and independent-variable-domain transformations can be used in place of the above-described quasi-logarithmic remapping function. It is advantageous to employ an earth-response parameterization across data sets corresponding to multiple EM sensors in a CSEM survey, for efficiency and data-processing-consistency considerations.

Figure 23:
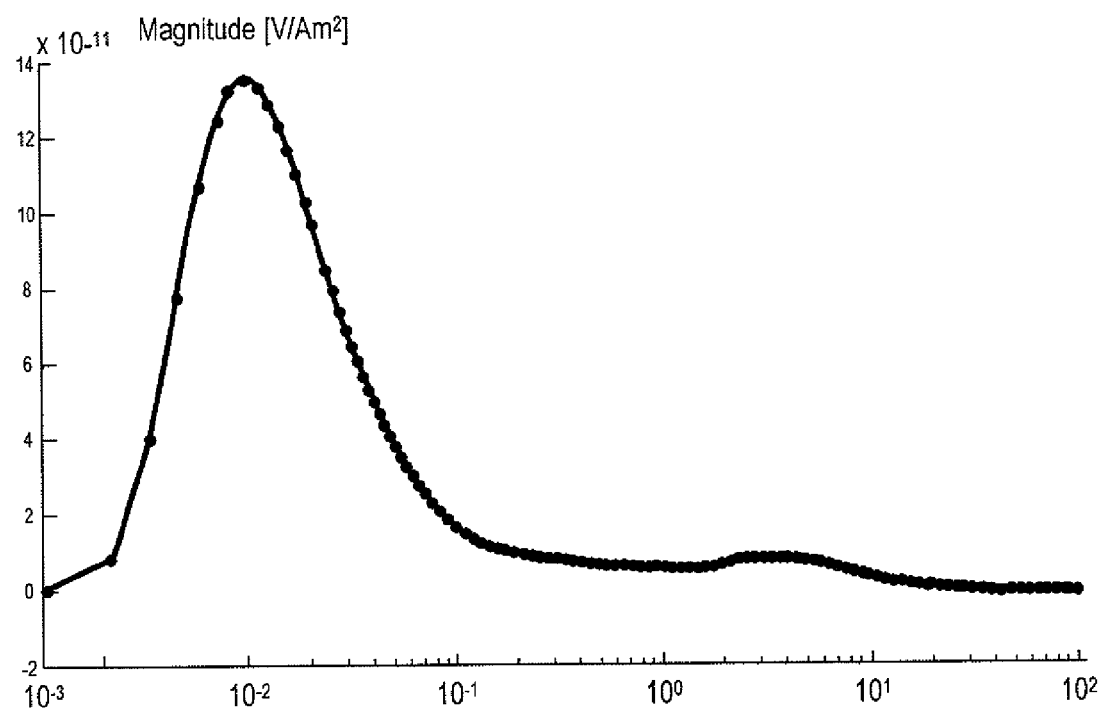
FIG. 23 shows an example of a modeled earth impulse response which is decimated in a quasi-logarithmic fashion.

FIG. 23 shows an example of a modeled earth impulse response which is decimated in a quasi-logarithmic fashion, as discussed above. In this figure, the samples or parameters are indicated, as in FIGS. 19C-19N, by filled disks or dots. In this example, the number of parameters is reduced, by parameterization, from 12,500 to 256, or by a factor of 48.8. The greatest savings in parameters occurs in the tail portion of the earth-response curves. A regularly sampled response would have 11,250 samples in the last decade, corresponding to data-collection times from ten seconds to 100 seconds, while the decimated response has only 74 parameters.

The increase in accuracy of extracted earth responses from EM-sensor data using the above-described parameterization method may significantly improve the results of intermediate-stage and final-stage data processing of CSEM-survey data. In addition, many of the intermediate-stage and final data-processing methods employ techniques based on the number of parameters encoded for earth responses. The complexity of the computational techniques increases significantly with the number of parameters. Therefore, optimal or near-optimal parameterization of earth responses can lead to significant decreases in computational complexity and corresponding increases in computational efficiency, leading to a decrease in data-processing times, decreases in energy consumed by computational machinery, decreases in utilization of electronic memories and mass-storage devices with attendant decreased costs and mean-time-to-failure of data-storage components, and a variety of additional advantages.

Although the present invention has been described in terms of particular embodiments, it is not intended that the invention be limited to these embodiments. Modifications within the spirit of the invention will be apparent to those ordinarily skilled in the art. For example, many different implementations of the currently disclosed data-processing methods and systems can be obtained by varying any of many different implementation and design parameters, including modular organization, programming language, operating system, computer-hardware platform, data structures, control structures, and many other such parameters. Many of a large variety of different nonlinear rescaling functions can be used to produce a variety of different data-processing methods and systems in the family of the data-processing methods and systems disclosed above. As discussed above, many other earth-response parameterization techniques can be applied to parameterize an earth response consistently with an estimate of the significant degrees of freedom across a time domain of frequency domain. The number of data points in a EM-sensor data set, or data vector, may exceed the number of parameters of a parameterized earth response by a factor of 5, 10, 20, 40, 50, or more times without significantly degrading or distorting the non-parameterized earth response reconstructed from the parameterized earth response. Although, in the preceding discussion, parameterization is carried out on EM-sensor data following data reception, in alternative systems and applications, a parameterization may be determined based on model data or previously collected and processed data and then applied to subsequently received EM-sensor data. In certain implementations, a set of parameterizations may be developed for various types of applications, with the parameterization selected for processing a particular data set selected based on various characteristics and attributes of the data set and survey that produced the data set.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An EM-survey data-processing system comprising:
one or more processors; and
one or more electronic memories and data-storage devices that store EM-sensor data, earth responses extracted from the EM-sensor data, and computer instructions that, when executed by the one or more processors, control an EM-survey data processing system to:
receive and store multiple data sets obtained from multiple EM sensors in one or both of the one or more electronic memories and data-storage devices;
determine a parameterization for earth responses to be extracted from the stored multiple data sets obtained from multiple EM sensors, the parameterization defined by one or more parameter values, the number of parameter values that define the parameterization at least 5 times less than the minimum number of data points in any one of the multiple data sets;
estimate the values of the parameters that define the parameterized earth response from a stored data set selected from the stored multiple data sets by an estimation method that uses a greater number of data points of the selected stored data set than the number of parameter values to estimate the number of parameter values;
reconstruct an earth response from the estimated parameter values; and
store the reconstructed earth response in one or both of the one or more electronic memories and data-storage devices.

2. The EM-survey data-processing system of claim 1 wherein the EM-survey data-processing system determines a parameterization for earth responses by sampling the independent-variable domain for the earth responses non-uniformly and, for each segment of the independent-variable domain, at a minimally sufficient or near-minimally sufficient sampling rate that allows for reconstruction of a non-parameterized earth response.

3. The EM-survey data-processing system of claim 1 wherein the EM-survey data-processing system determines a parameterization for earth responses by sampling the independent-variable domain for the earth responses non-uniformly and, for each segment of the independent-variable domain, at a sampling rate that is a constant multiple of the highest-frequency component of the earth response present within the segment.

4. The EM-survey data-processing system of claim 1 wherein the number of data points in the stored data set selected from the stored multiple data sets exceeds the number of parameters for a parameterized earth response by a factor of at least 10.

5. The EM-survey data-processing system of claim 1 wherein the number of data points in the stored data set selected from the stored multiple data sets exceeds the number of parameters for a parameterized earth response by a factor of at least 20.

6. The EM-survey data-processing system of claim 1 wherein the number of data points in the stored data set selected from the stored multiple data sets exceeds the number of parameters for a parameterized earth response by a factor of at least 40.

7. The EM-survey data-processing system of claim 1 wherein the number of data points in the stored data set selected from the stored multiple data sets exceeds the number of parameters for a parameterized earth response by a factor of at least 50.

8. The EM-survey data-processing system of claim 1 wherein the EM-survey data-processing system estimates values of parameters for an earth response, parameterized by the determined parameterization, from the stored data set selected from the stored multiple data sets by using an optimization method that estimates a number of parameters from an over-determining data set.

9. The EM-survey data-processing system of claim 8 wherein the optimization method is a least-squares method.

10. The EM-survey data-processing system of claim 1 wherein the EM-survey data-processing system determines a parameterization for earth responses by transforming an independent-variable domain for the earth responses and uniformly sampling the transformed independent-variable domain to select earth-response parameters.

11. The EM-survey data-processing system of claim 10 wherein the EM-survey data-processing system transforms the independent-variable domain using a parametric independent-variable remapping function.

12. The EM-survey data-processing system of claim 11 wherein the EM-survey data-processing system selects a range of parameter values for the parametric independent-variable remapping function that provides a specified data-sampling rate across the independent-variable domain with respect to one or more of the stored multiple data sets.

13. The EM-survey data-processing system of claim 12 wherein the EM-survey data-processing system selects a parameter value from the range of parameter values for the parametric independent-variable remapping function that provides for optimal or near-optimal non-parameterized earth-response reconstruction from selected parameterized earth responses.

14. A method for processing EM-survey data, the method comprising:
  receiving and storing a data set obtained from an EM sensor in one or both of one or more electronic memories and one or more mass-storage devices;
  estimating values of parameters for a parameterized earth response from the stored data set;
  interpolating an earth response from the estimated parameters; and
  storing the reconstructed earth response in one or both of the one or more electronic memories and data-storage devices.

15. The method of claim 14 wherein an earth response is parameterized by transforming an independent-variable domain for the earth response and uniformly sampling the transformed independent-variable domain to select earth-response parameters.

16. The method of claim 14 wherein an earth response is parameterized by sampling the independent-variable domain for the earth response non-uniformly and, for each segment of the independent-variable domain, at a minimally sufficient or near-minimally sufficient sampling rate that allows for reconstruction of the earth response.

17. The method of claim 14 wherein an earth response is parameterized by sampling the independent-variable domain for the earth response non-uniformly and, for each segment of the independent-variable domain, at a sampling rate that is a constant multiple of the highest-frequency component of the earth response present within the segment.

18. The method of claim 14 wherein the number of data points in the stored data set exceeds the number of parameters of the parameterized earth response by a factor of at least one of:
  10;
  20;
  40; and
  50.

19. The method of claim 14 wherein estimating values of parameters for an earth response parameterized by the determined parameterization from the stored data set further includes using an optimization method that estimates a number of parameters from an over-determining data set.

20. The method of claim 19 wherein the optimization method is a least-squares method.

21. An EM-survey method comprising:
  generating a time-varying EM field using one or more EM sources;
  sensing a secondary time-varying EM field using multiple EM sensors; and
  using, to process data obtained from the multiple EM sensors, an EM-survey data-processing system that includes one or more processors and one or more electronic memories and data-storage devices that store EM-sensor data, earth responses extracted from the EM-sensor data, and computer instructions that, when executed by the one or more processors, control the EM-survey data processing system to
    receive and store multiple data sets obtained from the multiple EM sensors in one or both of the one or more electronic memories and data-storage devices;
    determine a parameterization for earth responses to be extracted from the stored multiple data sets obtained from multiple EM sensors, the parameterization defined by one or more parameter values, the number of parameter values that define the parameterization at least 5 times less than the minimum number of data points in any one of the multiple data sets;
    estimate the values of the parameters that define the parameterized earth response from a stored data set selected from the stored multiple data sets by an estimation method that uses a greater number of data points of the selected stored data set than the number of parameter values to estimate the number of parameter values;
    reconstruct an earth response from the estimated parameters; and
    store the reconstructed earth response in one or both of the one or more electronic memories and data-storage devices.

22. The EM-survey method of claim 21 wherein the EM-survey data-processing system determines a parameterization for earth responses by sampling the independent-variable domain for the earth responses non-uniformly and, for each segment of the independent-variable domain, at a minimally sufficient or near-minimally sufficient sampling rate that allows for reconstruction of a non-parameterized earth response.

23. The EM-survey method of claim 21 wherein the EM-survey data-processing system determines a parameterization for earth responses by sampling the independent-variable domain for the earth responses non-uniformly and, for each segment of the independent-variable domain, at a sampling rate that is a constant multiple of the highest-frequency component of the earth response present within the segment.

24. The EM-survey method of claim 21 wherein the EM-survey data-processing system estimates values of parameters for an earth response, parameterized by the determined parameterization, from the stored data set selected from the stored multiple data sets by using an optimization method that estimates a number of parameters from an over-determining data set.

25. The EM-survey method of claim 21 wherein the number of data points in the stored data set selected from the stored multiple data sets exceeds the number of parameters for a parameterized earth response by a factor of at least one of:
  10;
  20;
  30;
  40; and
  50.

26. The EM-survey method of claim 21, wherein generating a time-varying EM field using one or more EM sources further comprises towing an EM source through a body of water.

27. The EM-survey method of claim 26, wherein the EM source is a bipole transmission antenna.

28. The EM-survey method of claim 26, wherein sensing a secondary time-varying EM field using multiple EM sensors further comprises towing a plurality of EM sensors through the body of water.

29. The EM-survey method of claim 21 wherein the EM-survey data-processing system determines a parameterization for earth responses by transforming an independent-variable domain for the earth responses and uniformly sampling the transformed independent-variable domain to select earth-response parameters.

30. The EM-survey method of claim 29 wherein the EM-survey data-processing system transforms the independent-variable domain using a parametric independent-variable remapping function.

31. The EM-survey method of claim 30 wherein the EM-survey data-processing system selects a range of parameter values for the parametric independent-variable remapping function that provides a specified data-sampling rate across the independent-variable domain with respect to one or more of the stored multiple data sets.

32. The EM-survey method of claim 31 wherein the EM-survey data-processing system selects a parameter value from the range of parameter values for the parametric independent-variable remapping function that provides for optimal or near-optimal non-parameterized earth-response reconstruction from selected parameterized earth responses.

* * * * *